(12) United States Patent
Hara et al.

(10) Patent No.: US 10,222,880 B2
(45) Date of Patent: Mar. 5, 2019

(54) STYLUS AND CONTROLLER

(71) Applicant: Wacom Co., Ltd., Saitama (JP)

(72) Inventors: Hideyuki Hara, Tokyo (JP); Sadao Yamamoto, Tokyo (JP); Shunya Saito, Tokyo (JP)

(73) Assignee: Wacom Co., Ltd., Kazo-shi, Saitama (JP)

( * ) Notice: Subject to any disclaimer, the term of this patent is extended or adjusted under 35 U.S.C. 154(b) by 0 days.

(21) Appl. No.: 16/040,942

(22) Filed: Jul. 20, 2018

(65) Prior Publication Data

US 2018/0329528 A1 Nov. 15, 2018

Related U.S. Application Data

(63) Continuation of application No. 15/833,682, filed on Dec. 6, 2017, now Pat. No. 10,061,407, which is a continuation of application No. PCT/JP2016/079731, filed on Oct. 6, 2016.

(51) Int. Cl.
*G06F 3/038* (2013.01)
*G06F 3/041* (2006.01)
*G06F 3/044* (2006.01)
*G02F 1/1333* (2006.01)
*G06F 3/0354* (2013.01)

(52) U.S. Cl.
CPC ...... *G06F 3/03545* (2013.01); *G02F 1/13338* (2013.01); *G06F 3/0383* (2013.01); *G06F 3/044* (2013.01); *G06F 3/0412* (2013.01); *G06F 3/0414* (2013.01); *G06F 3/0416* (2013.01)

(58) Field of Classification Search
CPC combination set(s) only.
See application file for complete search history.

(56) References Cited

U.S. PATENT DOCUMENTS

| | | | |
|---|---|---|---|
| 9,870,075 | B2 | 1/2018 | Han et al. |
| 2010/0085325 | A1 | 4/2010 | King-Smith et al. |
| 2010/0182273 | A1 | 7/2010 | Noguchi et al. |

(Continued)

FOREIGN PATENT DOCUMENTS

| | | |
|---|---|---|
| JP | 2009-244958 A | 10/2009 |
| JP | 2011-233018 A | 11/2011 |

(Continued)

OTHER PUBLICATIONS

Written Opinion of the International Searching Authority, dated Dec. 6, 2016, for International Application No. PCT/JP2016/079731, 10 pages.

*Primary Examiner* — Priyank J Shah

(74) *Attorney, Agent, or Firm* — Seed IP Law Group LLP

(57) ABSTRACT

A controller of an in-cell type liquid crystal display device is provided. The controller controls first and second electrodes that intersect each other, supplies a pixel driving voltage to the first electrodes during a pixel driving period, and detects a stylus position using the first and second electrodes during a stylus detection period different from the pixel driving period. The controller transmits, using the second electrodes, a command requesting a transmission of a downlink signal to the stylus. The controller detects, using the first and second electrodes, the downlink signal transmitted from the stylus in response to the command, and detects the stylus position based on the detected downlink signal.

18 Claims, 18 Drawing Sheets

(56) References Cited

U.S. PATENT DOCUMENTS

| | | |
|---|---|---|
| 2011/0267293 A1 | 11/2011 | Noguchi et al. |
| 2012/0098776 A1* | 4/2012 | Chen .................... G06F 3/0416 345/173 |
| 2014/0232693 A1 | 8/2014 | Schuckle et al. |
| 2015/0062062 A1 | 3/2015 | Han et al. |
| 2015/0130734 A1 | 5/2015 | Chang et al. |
| 2015/0220208 A1 | 8/2015 | Noguchi et al. |
| 2015/0346875 A1* | 12/2015 | Yeh .................... G06F 3/03545 345/174 |
| 2016/0070373 A1 | 3/2016 | Hamaguchi |
| 2016/0077655 A1 | 3/2016 | Oda |
| 2016/0116997 A1 | 4/2016 | Kim et al. |
| 2016/0188005 A1 | 6/2016 | Ju et al. |
| 2016/0188006 A1 | 6/2016 | Han et al. |
| 2016/0188007 A1 | 6/2016 | Jung et al. |
| 2016/0320918 A1 | 11/2016 | Hara |
| 2017/0031465 A1 | 2/2017 | Jung et al. |
| 2017/0060337 A1 | 3/2017 | Kim et al. |
| 2017/0192591 A1 | 7/2017 | Jang et al. |

FOREIGN PATENT DOCUMENTS

| | | |
|---|---|---|
| JP | 2014-209361 A | 11/2014 |
| JP | 2015-164033 A | 9/2015 |
| JP | 582697 B2 | 12/2015 |
| JP | 2016-62205 A | 4/2016 |
| WO | 2015/111159 A1 | 7/2015 |

* cited by examiner

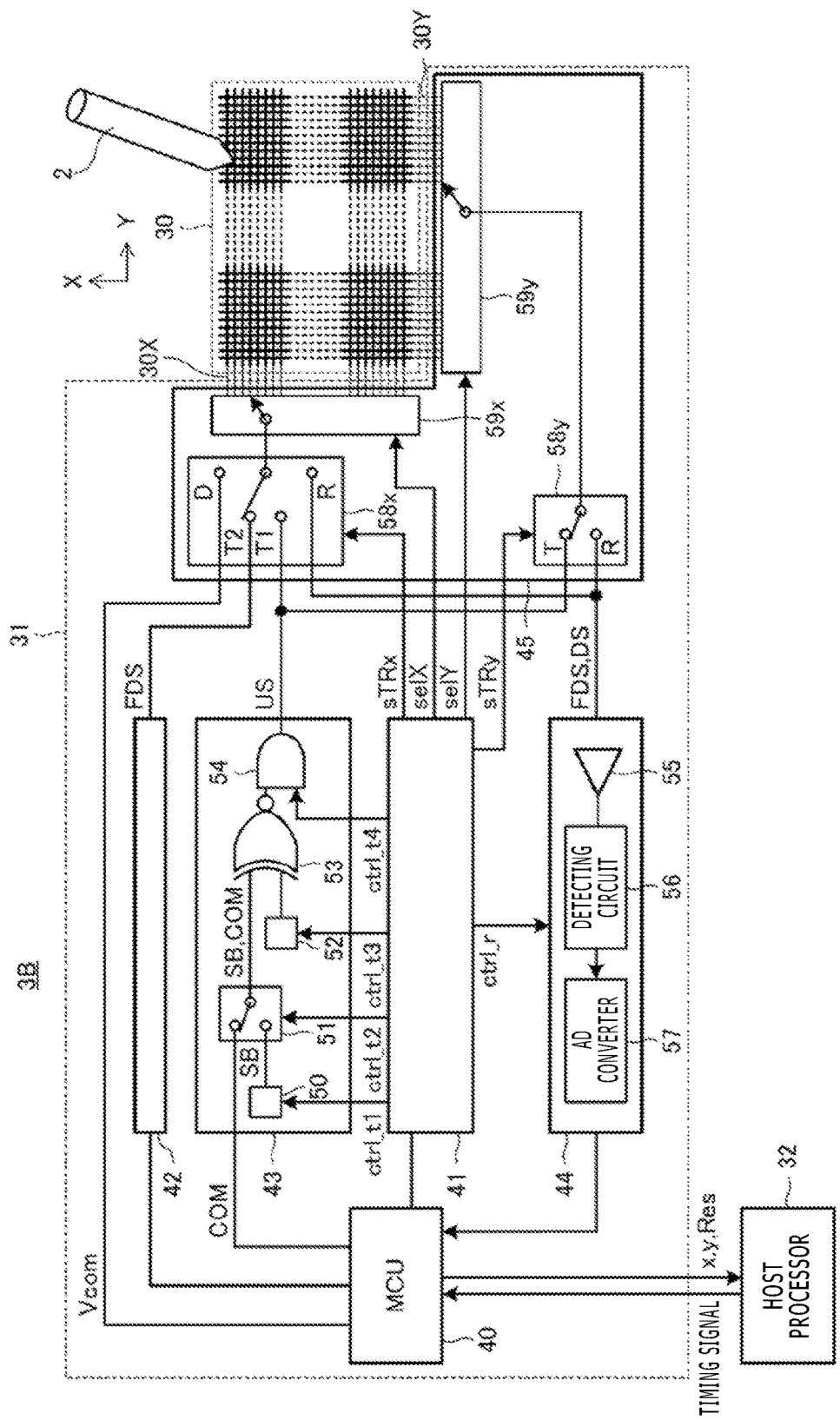

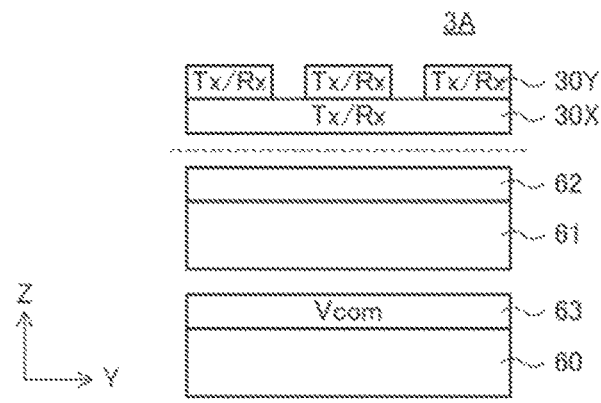
FIG. 5A
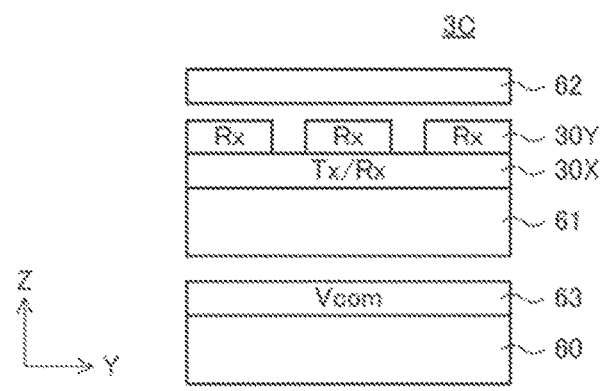
FIG. 5B
FIG. 6
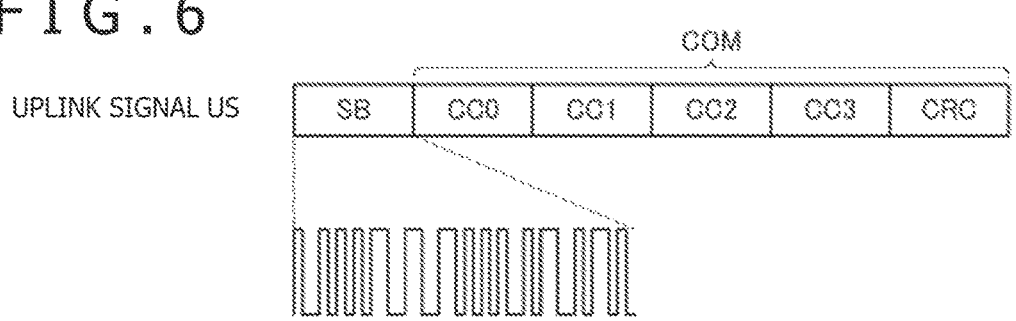

FIG. 15A

| | DETAILS OF OPERATION |
|---|---|
| T1 | SEND COMMAND |
| T2 | DETECT STYLUS/FINGER |
| T3 | DETECT STYLUS/FINGER |
| T4 | DETECT STYLUS/FINGER |
| T5 | DETECT STYLUS/FINGER |
| T6 | DETECT STYLUS/FINGER |
| T7 | DETECT STYLUS/FINGER |
| T8 | DETECT STYLUS/FINGER |
| T9 | DETECT STYLUS/FINGER |
| T10 | DETECT STYLUS/FINGER |
| T11 | DETECT STYLUS/FINGER |
| T12 | DETECT STYLUS/FINGER |
| T13 | DETECT STYLUS/FINGER |
| T14 | DETECT STYLUS/FINGER |
| T15 | DETECT STYLUS/FINGER |
| T16 | DETECT STYLUS/FINGER |
| T17 | DETECT STYLUS/FINGER |
| T18 | DETECT STYLUS/FINGER |
| T19 | DETECT STYLUS/FINGER |
| T20 | DETECT STYLUS/FINGER |
| T21 | SEND COMMAND |
| T22 | DETECT STYLUS/FINGER |
| T23 | DETECT STYLUS/FINGER |
| T24 | DETECT STYLUS/FINGER |
| T25 | DETECT STYLUS/FINGER |
| T26 | DETECT STYLUS/FINGER |
| T27 | DETECT STYLUS/FINGER |
| T28 | DETECT STYLUS/FINGER |
| T29 | DETECT STYLUS/FINGER |
| T30 | DETECT STYLUS/FINGER |
| T31 | DETECT STYLUS/FINGER |
| T32 | DETECT STYLUS/FINGER |
| T33 | DETECT STYLUS/FINGER |
| T34 | DETECT STYLUS/FINGER |
| T35 | DETECT STYLUS/FINGER |
| T36 | DETECT STYLUS/FINGER |
| T37 | DETECT STYLUS/FINGER |
| T38 | DETECT STYLUS/FINGER |
| T39 | DETECT STYLUS/FINGER |
| T40 | DETECT STYLUS/FINGER |

BEFORE STYLUS DETECTION

FIG. 15B

| | DETAILS OF OPERATION |
|---|---|
| T1 | SEND COMMAND |
| T2 | DETECT STYLUS |
| T3 | RECEIVE DATA 0 |
| T4 | DETECT FINGER |
| T5 | DETECT STYLUS |
| T6 | RECEIVE DATA 1 |
| T7 | RECEIVE DATA 2 |
| T8 | DETECT FINGER |
| T9 | DETECT STYLUS |
| T10 | RECEIVE DATA 3 |
| T11 | RECEIVE DATA 4 |
| T12 | DETECT FINGER |
| T13 | DETECT STYLUS |
| T14 | RECEIVE DATA 5 |
| T15 | RECEIVE DATA 6 |
| T16 | DETECT FINGER |
| T17 | DETECT STYLUS |
| T18 | RECEIVE DATA 7 |
| T19 | RECEIVE DATA 8 |
| T20 | DETECT FINGER |
| T21 | DETECT STYLUS |
| T22 | RECEIVE DATA 9 |
| T23 | RECEIVE DATA 10 |
| T24 | DETECT FINGER |
| T25 | DETECT STYLUS |
| T26 | RECEIVE DATA 11 |
| T27 | RECEIVE DATA 12 |
| T28 | DETECT FINGER |
| T29 | DETECT STYLUS |
| T30 | RECEIVE DATA 13 |
| T31 | RECEIVE DATA 14 |
| T32 | DETECT FINGER |
| T33 | DETECT STYLUS |
| T34 | RECEIVE DATA 15 |
| T35 | RECEIVE DATA 16 |
| T36 | DETECT FINGER |
| T37 | DETECT STYLUS |
| T38 | RECEIVE DATA 17 |
| T39 | RECEIVE DATA 18 |
| T40 | RECEIVE DATA 19 |

AFTER STYLUS DETECTION

FIG. 16A

| | DETAILS OF OPERATION |
|---|---|
| T1 | DETECT COMMAND |
| T2 | |
| T3 | |
| T4 | |
| T5 | |
| T6 | |
| T7 | |
| T8 | |
| T9 | |
| T10 | |
| T11 | SEND POSITION SIGNAL |
| T12 | |
| T13 | |
| T14 | |
| T15 | |
| T16 | |
| T17 | |
| T18 | |
| T19 | |
| T20 | |
| T21 | DETECT COMMAND |
| T22 | |
| T23 | |
| T24 | |
| T25 | |
| T26 | |
| T27 | |
| T28 | |
| T29 | |
| T30 | |
| T31 | SEND POSITION SIGNAL |
| T32 | |
| T33 | |
| T34 | |
| T35 | |
| T36 | |
| T37 | |
| T38 | |
| T39 | |
| T40 | |

BEFORE DETECTION

FIG. 16B

| | DETAILS OF OPERATION |
|---|---|
| T1 | DETECT COMMAND |
| T2 | SEND POSITION SIGNAL |
| T3 | SEND DATA (1) |
| T4 | ... |
| T5 | SEND POSITION SIGNAL |
| T6 | SEND DATA (SW2) |
| T7 | SEND DATA (SW1) |
| T8 | ... |
| T9 | SEND POSITION SIGNAL |
| T10 | SEND DATA (0) |
| T11 | SEND DATA (1) |
| T12 | ... |
| T13 | SEND POSITION SIGNAL |
| T14 | SEND DATA (0) |
| T15 | SEND DATA (1) |
| T16 | ... |
| T17 | SEND POSITION SIGNAL |
| T18 | SEND DATA (0) |
| T19 | SEND DATA (1) |
| T20 | ... |
| T21 | SEND POSITION SIGNAL |
| T22 | SEND DATA (0) |
| T23 | SEND DATA (1) |
| T24 | ... |
| T25 | SEND POSITION SIGNAL |
| T26 | SEND DATA (0) |
| T27 | SEND DATA (1) |
| T28 | ... |
| T29 | SEND POSITION SIGNAL |
| T30 | SEND DATA (0) |
| T31 | SEND DATA (1) |
| T32 | ... |
| T33 | SEND POSITION SIGNAL |
| T34 | SEND DATA (0) |
| T35 | SEND DATA (1) |
| T36 | ... |
| T37 | SEND POSITION SIGNAL |
| T38 | SEND DATA (0) |
| T39 | SEND DATA (1) |
| T40 | SEND DATA (0) |

AFTER DETECTION/DURING HOVERING

FIG. 16C

| | DETAILS OF OPERATION |
|---|---|
| T1 | DETECT COMMAND |
| T2 | SEND POSITION SIGNAL |
| T3 | SEND DATA (0) |
| T4 | ... |
| T5 | SEND POSITION SIGNAL |
| T6 | SEND DATA (P13) |
| T7 | SEND DATA (P12) |
| T8 | ... |
| T9 | SEND POSITION SIGNAL |
| T10 | SEND DATA (P11) |
| T11 | SEND DATA (P10) |
| T12 | ... |
| T13 | SEND POSITION SIGNAL |
| T14 | SEND DATA (P9) |
| T15 | SEND DATA (P8) |
| T16 | ... |
| T17 | SEND POSITION SIGNAL |
| T18 | SEND DATA (P7) |
| T19 | SEND DATA (P6) |
| T20 | ... |
| T21 | SEND POSITION SIGNAL |
| T22 | SEND DATA (P5) |
| T23 | SEND DATA (P4) |
| T24 | ... |
| T25 | SEND POSITION SIGNAL |
| T26 | SEND DATA (P3) |
| T27 | SEND DATA (P2) |
| T28 | ... |
| T29 | SEND POSITION SIGNAL |
| T30 | SEND DATA (P1) |
| T31 | SEND DATA (P0) |
| T32 | ... |
| T33 | SEND POSITION SIGNAL |
| T34 | SEND DATA (SW2) |
| T35 | SEND DATA (SW1) |
| T36 | ... |
| T37 | SEND POSITION SIGNAL |
| T38 | SEND DATA (Sum2) |
| T39 | SEND DATA (Sum1) |
| T40 | SEND DATA (Sum0) |

AFTER DETECTION/DURING CONTACT

STYLUS AND CONTROLLER

BACKGROUND

Technical Field

The present disclosure relates to a stylus and a controller and, in particular, to a stylus and a controller used for a position detection system whose liquid crystal display surface has a touch surface function.

Description of the Related Art

Recent years have seen widespread use of electronic apparatuses such as smartphones and tablet computers whose liquid crystal display surfaces have a touch surface function. Electronic apparatuses of this kind were realized at first by providing a transparent electrode for a touch sensor as a separate component on the display screen of a liquid crystal component. Recently, however, a technology has come into use that employs liquid crystal screen electrodes (common electrodes and pixel electrodes) also as part of touch sensor electrodes, to reduce the component count or the thickness. In the description given below, a type of electronic apparatus having touch sensor electrodes on the display screen independently of display screen electrodes will be referred to as a "non-in-cell" type, and a type of electronic apparatus using display screen electrodes as part of touch sensor electrodes will be referred to as an "in-cell" type.

Patent Document 1 discloses an example of an in-cell type electronic apparatus. In this example, one of a pair of electrodes forming a mutual capacitance touch sensor also serves as a common electrode of a liquid crystal display device.

Patent Document 2 also discloses an example of an in-cell type electronic apparatus. The document describes that, in an electronic apparatus similar to that described in Patent Document 1, a touch detection operation and a display operation are performed in a time-divided manner every display horizontal period and that a different drive electrode is selected every display horizontal period during the touch detection operation.

In recent years, on the other hand, active capacitive styluses configured to be able to send and receive signals to and from position detection devices are increasingly used as input devices for making handwriting input to the touch surface of an electronic apparatus. In the description given below, an active capacitive stylus will be simply referred to as a "stylus." A signal sent from a stylus to an electronic apparatus will be referred to as a "downlink signal," and a signal sent from an electronic apparatus to a stylus will be referred to as an "uplink signal."

Patent Document 3 describes an example of a stylus configured to send a signal modulated with pen pressure information or a unique identification (ID) and a non-modulated continuous signal for position detection. In the description given below, a signal for position detection purposes having a defined pattern and not including information, such as a non-modulated signal, will be referred to as a "position signal," and a signal modulated with pen pressure information or a unique ID will be referred to as a "data signal."

PRIOR ART DOCUMENT

Patent Documents

Patent Document 1: Japanese Patent Laid-open No. 2009-244958

Patent Document 2: Japanese Patent Laid-open No. 2011-233018

Patent Document 3: PCT Patent Publication No. 2015/111159

BRIEF SUMMARY

Technical Problems

It would be convenient if a stylus as described above could be used with non-in-cell type and in-cell type electronic apparatuses. In this case, a touch sensor electrode is used not only as an electrode for receiving downlink signals but also as an electrode for transmitting uplink signals.

In in-cell type electronic apparatuses, however, liquid crystal screen electrodes (common electrodes and pixel electrodes) serve also as some of touch sensor electrodes. Therefore, those dual-purpose touch sensor electrodes cannot be used to receive downlink signals or send uplink signals during a pixel driving operation in which the liquid crystal screen electrodes are set to a pixel driving potential. This has been the cause of a variety of challenges, which will be described below, for the purpose of making a stylus usable with non-in-cell type and in-cell type electronic apparatuses, and solutions to the challenges have been desired.

The first challenge is to configure a stylus that can be used with both non-in-cell type and in-cell type electronic apparatuses. It would be convenient if a user could use a single stylus with both non-in-cell type and in-cell type electronic apparatuses without having to change styluses. In order to make a stylus usable with in-cell type electronic apparatuses, it is necessary to configure the stylus such that it halts the transmission of a downlink signal during a pixel driving operation of the liquid crystal display device. However, this transmission halt period is useless from the viewpoint of non-in-cell type electronic apparatuses that can receive a downlink signal even during a pixel driving operation. Configuring a stylus to send a downlink signal even during a pixel driving operation eliminates the transmission halt period that is useless as seen from a non-in-cell type electronic apparatus. However, when the stylus is used in turn with an in-cell type electronic apparatus, the electronic apparatus will fail to receive a downlink signal, resulting in loss of transmission information. Thus, it is difficult to strike a balance between improving transmission efficiency when the stylus is used with a non-in-cell type electronic apparatus and preventing loss of transmission information when the stylus is used with an in-cell type electronic apparatus. As a result, it has been considered difficult to configure a single stylus that can be used with both non-in-cell type and in-cell type electronic apparatuses.

The second challenge is to reduce the amount of time required from the detection of an uplink signal from an in-cell type electronic apparatus by a stylus to the start of transmission of a downlink signal to the electronic apparatus. In order to send a downlink signal to an in-cell type electronic apparatus, a stylus must figure out the time period during which a pixel driving operation is not performed in the electronic apparatus (hereinafter referred to as a "blank period"). If the electronic apparatus is to send, to the stylus, an uplink signal that includes information on arrangement of blank periods (e.g., interval, duration) as part of a negotiation operation conducted at the start of communication, the size of such uplink signal is extremely large, resulting in a long period of time before the stylus can start transmission of a downlink signal. This time period needs to be shortened.

The third challenge is to secure the rate at which position detection is performed when a stylus is used with an in-cell type electronic apparatus. In the case of an in-cell type electronic apparatus, there is a time period during which a downlink signal cannot be sent as described above, and thus the frequency of position signal transmission must be reduced by the amount corresponding to that time period. This leads to a low rate at which position detection is performed, which requires improvement.

It is an aspect of the present disclosure to provide a stylus and a controller that can solve these challenges to make a stylus usable with non-in-cell type and in-cell type electronic apparatuses.

Technical Solution

A stylus according to a first aspect of the present disclosure is a stylus configured to be able to send, to an electronic apparatus, data made up of K-bit (K>0) digital value and includes a stylus electrode and a signal processing circuit. The stylus electrode forms a coupling capacitance with a sensor electrode of the electronic apparatus. The signal processing circuit detects an uplink signal using the stylus electrode, extracts a command from the detected uplink signal, determines, based on the command, in which mode to operate between a first mode in which the data is sent using M (M≥1) first periods and a second mode in which the data is sent using N (N>M) second periods, and repeatedly sends the data in accordance with the determined mode.

A stylus according to a second aspect of the present disclosure is the stylus according to the first aspect whose signal processing circuit further starts transmission of the data in response to detection of a shortened synchronizing signal when operating in the second mode. The shortened synchronizing signal is one of the uplink signals and has a shorter time length than the uplink signal that includes the command.

A controller according to a third aspect of the present disclosure is a controller of a display device configured to perform a stylus detection operation in each of N (N>1) second periods arranged within a display cycle, which is a cycle of display operation. The controller, after the detection of the stylus by the detection operation, sends a second command once within the display cycle, wherein the second command identifies data to be sent by the stylus using the second period. The controller, before the detection of the stylus by the detection operation, sends a first command a plurality of times within the display cycle, wherein the first command includes type identification information that identifies the type of the display device.

A stylus according to a fourth aspect of the present disclosure is a stylus used with a controller of a display device configured to perform a stylus detection operation in each of N (N>1) second periods arranged within a display cycle, which is a cycle of display operation. The stylus sends a position signal in response to reception, from the controller, of a first command including type identification information that identifies a type of the display device, and sends a data signal in response to reception, from the controller, of a second command that identifies data to be sent using the second period, wherein the data signal includes data identified by the second command.

A controller according to a fifth aspect of the present disclosure is a controller of an in-cell type liquid crystal display device. The controller has first and second electrodes that intersect each other, supplies a pixel driving voltage to the first electrodes during a pixel driving period, and detects the stylus position using the first and second electrodes during a stylus detection period different from the pixel driving period. The controller sends a command requesting the transmission of a downlink signal to the stylus using the second electrodes, performs detection of the downlink signal sent from the stylus in response to the command using the first and second electrodes, and detects the stylus position based on the detected downlink signal.

Advantageous Effects

According to the first aspect of the present disclosure, the stylus can improve data transmission efficiency by transmitting data (e.g., pen pressure) made up of a K-bit digital value using a relatively fewer number of first periods when the type of the electronic apparatus indicated by the command is a non-in-cell type, and on the other hand can prevent loss of transmission information by the electronic apparatus by transmitting data (e.g., pen pressure) made up of a K-bit digital value using a relatively more number of second periods when the type of the electronic apparatus indicated by the command is an in-cell type. Therefore, the stylus is usable with both non-in-cell type and in-cell type electronic apparatuses.

According to the second aspect of the present disclosure, the stylus can figure out the arrival (beginning) of each second period based on a simple (e.g., data comprised of a single spreading code) shortened synchronizing signal. Therefore, it is not necessary to send an uplink signal that includes information representing arrangement of blank periods (e.g., intervals, durations) at the start of communication, making it possible to reduce the amount of time required from the detection of an uplink signal from an in-cell type electronic apparatus by the stylus to the start of transmission of a downlink signal to the electronic apparatus.

According to the third or fourth aspect of the present disclosure, the controller realizes an in-cell type electronic apparatus (i.e., performs a stylus detection operation in each of N (N>1) second periods arranged within a display cycle, which is a cycle of display operation) and changes the transmission frequency of the command before and after the stylus detection. Specifically, after the stylus detection, the controller sends the command less frequently than before the stylus detection (once within a display cycle), and sends, before the stylus detection, the command that specifies a communication protocol to be used by the stylus to send a downlink signal more frequently than after the stylus detection. This makes it possible to reduce a response time for stylus detection before the stylus detection while at the same time securing the rate at which position detection is performed after the stylus detection when the stylus is used with an in-cell type electronic apparatus.

According to the fifth aspect of the present disclosure, the controller can also send a command to the stylus while the first electrodes are used to drive the pixels. Therefore, it is possible to secure the rate at which position detection is performed when the stylus is used with an in-cell type electronic apparatus.

BRIEF DESCRIPTION OF THE SEVERAL VIEWS OF THE DRAWINGS

FIG. 3 is a diagram illustrating a configuration of a tablet 3B depicted in FIG. 1.

FIG. 5A is a schematic cross-sectional view illustrating arrangement of the sensor electrodes 30X and 30Y in a tablet 3A, and FIG. 5B is a schematic cross-sectional view illustrating arrangement of the sensor electrodes 30X and 30Y in a tablet 3C.

FIG. 6 is a diagram illustrating a configuration of an uplink signal US.

FIGS. 15A and 15B are diagrams illustrating how the second periods T are used by the tablet 3B, and FIG. 15A illustrates the usage before detection of the stylus 2, and FIG. 15B illustrates the usage after detection of the stylus 2.

FIGS. 16A to 16C illustrate how the second periods T are used by the stylus 2, and FIG. 16A illustrates the usage before detection by the tablet 3B, FIG. 16B illustrates the usage after detection by the tablet 3B and when the stylus 2 is in a hovering state, and FIG. 16C illustrates the usage after detection by the tablet 3B and when the stylus 2 is in a contact state.

DETAILED DESCRIPTION

A detailed description will be given below of embodiments of the present disclosure with reference to the accompanying drawings.

Figure 1:
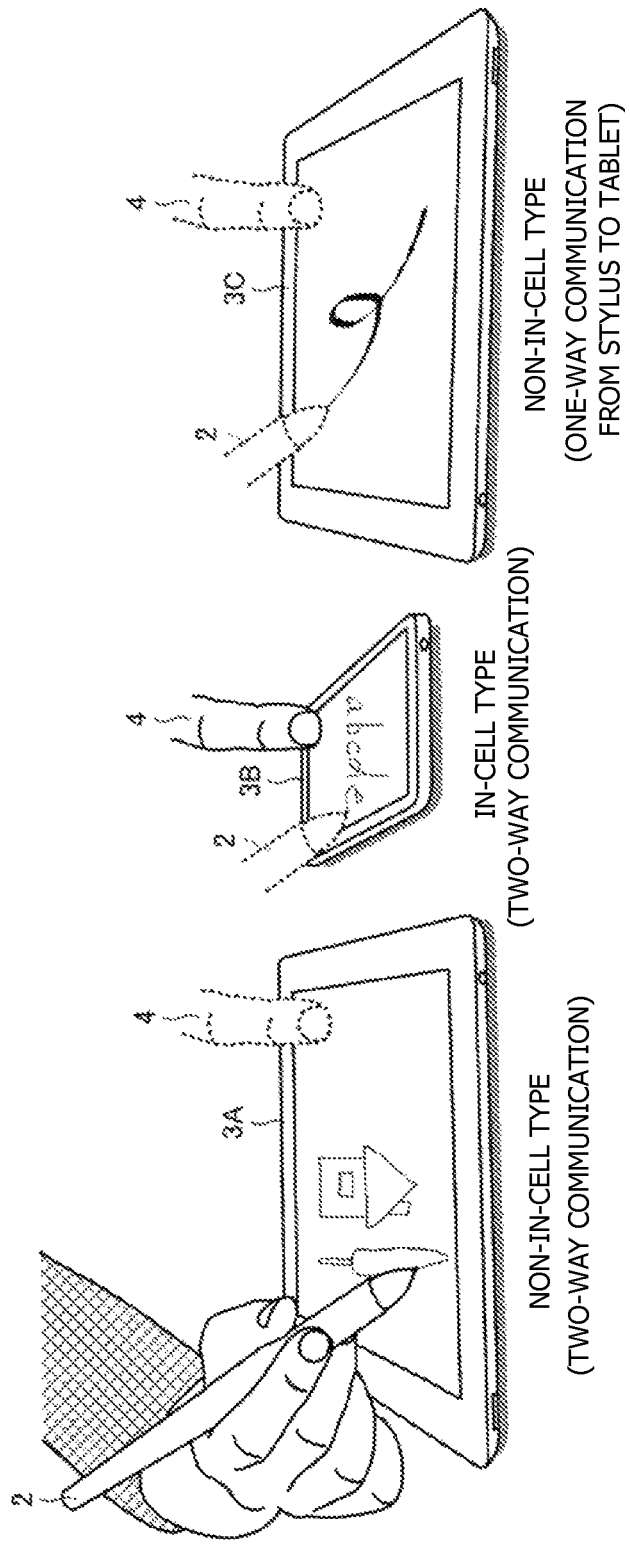
FIG. 1 is a diagram illustrating a state in which a position detection system according to a first embodiment of the present disclosure is used.

FIG. 1 is a diagram illustrating an example of a state in which a position detection system according to a first embodiment of the present disclosure is used. The position detection system according to the present embodiment includes tablets 3A, 3B, and 3C and a stylus 2.

Although the detailed configurations of the tablets 3A to 3C will be described later, the tablets 3A and 3C are non-in-cell type electronic apparatuses (display devices) described above, and the tablet 3B is an in-cell type electronic apparatus (display device) described above. Each of the tablets 3A to 3C is configured such that one can write a picture or text with both the stylus 2 and a user's finger 4. Also, both of the tablets 3A and 3B are configured to be able to send and receive signals to and from the stylus 2 in a two-way manner and each engage in two-way communication with the stylus 2. On the other hand, although configured to be able to receive a downlink signal from the stylus 2, the tablet 3C is not capable of transmitting an uplink signal to the stylus 2 and receives signals from the stylus 2 in a one-way manner.

The stylus 2 is a multi-protocol stylus (triple stylus) that supports three protocols (communication protocols) that support communication with the tablets 3A to 3C, respectively. A user writes a picture or text onto the tablets 3A to 3C by pressing a pen tip of the stylus 2 against one of touch surfaces of the tablets 3A to 3C and moving the pen tip of the stylus 2 on the touch surface while holding the pen tip pressed against the touch surface. Also, the user continues to use the stylus 2 which he or she has started to use, switching between the tablets 3A to 3C and without changing the stylus 2 to a different one.

Figure 2:
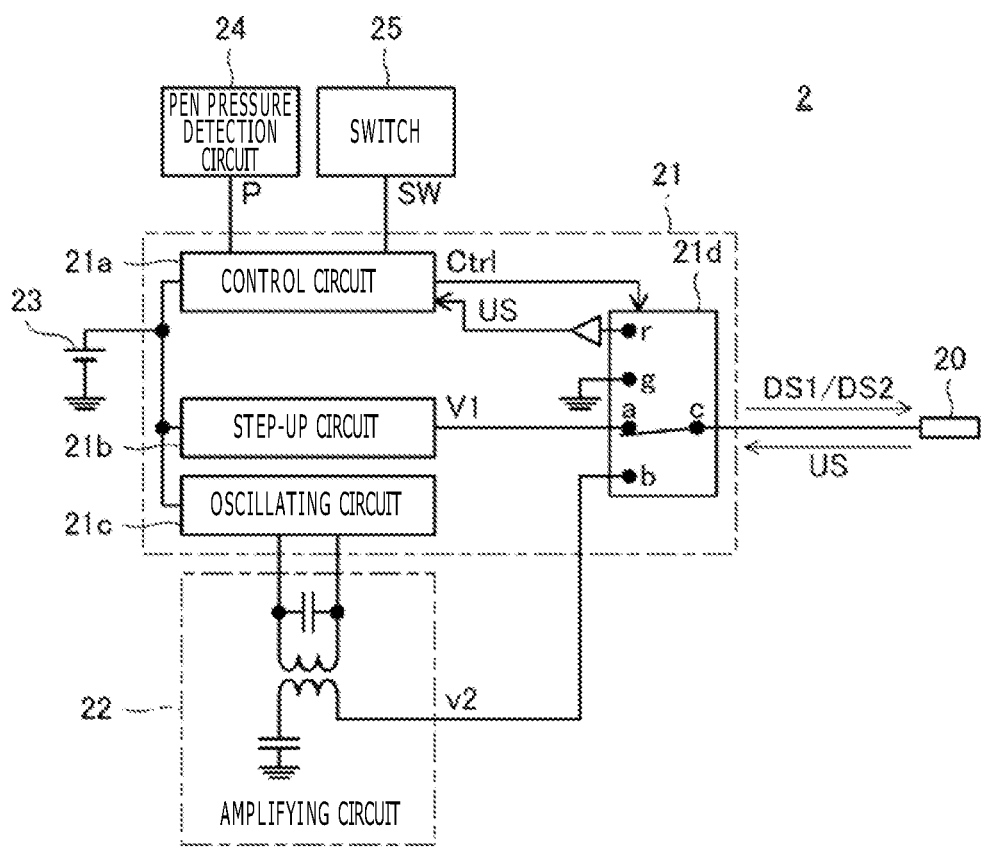
FIG. 2 is a diagram illustrating a configuration of a stylus 2 depicted in FIG. 1.

FIG. 2 is a diagram illustrating a configuration of the stylus 2. As depicted in the figure, the stylus 2 is configured to include a stylus electrode 20, a signal processing circuit 21, an amplifying circuit 22, a power supply 23, a pen pressure detecting circuit 24, and a switch 25.

The stylus electrode 20 is a conductor provided near the pen tip of the stylus 2 and plays not only a role of receiving uplink signals US sent by the tablets 3A and 3B and supplying the uplink signals US to the signal processing circuit 21 but also a role of transmitting downlink signals DS supplied from the signal processing circuit 21 to the tablets 3A to 3C.

The pen pressure detecting circuit 24 is configured to include a pressure sensor that detects a pressure (pen pressure) applied to the pen tip of the stylus 2, which is not depicted. The pen pressure detecting circuit 24 converts the pen pressure detected by the pressure sensor into pen pressure data P made up of a K-bit (K>0) digital value and supplies the pen pressure data P to the signal processing circuit 21.

The switch 25 is a switch provided on a housing surface (side surface or end surface) of the stylus 2 and is configured such that it can be switched ON and OFF by the user. Switch information SW indicating the ON/OFF state of this switch 25 is supplied to the signal processing circuit 21.

The power supply 23 is a functional circuit that supplies operating power to each circuit of the stylus 2 and is, for example, a battery.

The signal processing circuit 21 and the amplifying circuit 22 have a function to perform a reception process of receiving the uplink signal US supplied from the stylus electrode 20, generate a downlink signal DS1 or DS2 based on the result of the reception process, and supply the downlink signal to the stylus electrode 20.

In the present embodiment, the downlink signal DS1 is a downlink signal DS that includes a pulse train signal and the downlink signal DS2 is the downlink signal DS that includes a sine wave signal. More specifically, a position signal that is the downlink signal DS1 is a non-modulated pulse train signal, and a data signal that is the downlink signal DS1 is a signal obtained by modulating a pulse train signal with the pen pressure data P and so on. On the other hand, a position signal that is the downlink signal DS2 is a non-modulated sine wave signal, and a data signal that is the downlink signal DS2 is a signal obtained by modulating a sine wave signal with the pen pressure data P and so on. Each of the tablets 3A to 3C is configured to be able to receive either the downlink signal DS1 or DS2. For this reason, the signal processing circuit 21 of the stylus 2 is configured, before the start of communication with the tablets 3A to 3C, to detect the type of downlink signal DS that can be received by the tablet with which the signal processing circuit 21 will communicate and send the downlink signal that matches the detected type.

The signal processing circuit 21 is configured to include a control circuit 21a, a step-up circuit 21b, an oscillating circuit 21c, and a switch circuit 21d as illustrated in FIG. 2.

The step-up circuit 21b is a circuit that generates a direct current (DC) voltage V1 by increasing the DC voltage supplied from the power supply 23. In a specific example, the step-up circuit 21b includes a DC-DC converter or a charge pump circuit.

The oscillating circuit 21c is a circuit that generates a non-modulated sine wave signal that oscillates at a given frequency (carrier signal) by performing an oscillating operation based on the DC voltage supplied from the power supply 23. The amplifying circuit 22 plays a role of generating a non-modulated sine wave signal v2 by amplifying the sine wave signal generated by the oscillating circuit 21c with a given amplification factor. It is preferred that the amplifying circuit 22 should include an amplifying circuit made up of a transformer and capacitors as illustrated in FIG. 2.

The switch circuit 21d is a switch element configured such that a common terminal c is connected to one of terminals a, b, g, and r. The terminal a is connected to the output end of the step-up circuit 21b. The terminal b is connected to the output end of the amplifying circuit 22. The terminal g is connected to power-supply wiring, to which a ground potential is supplied. The terminal r is connected to a receiving terminal of the control circuit 21a via a buffer. The common terminal c is connected to the stylus electrode 20.

The control circuit 21a is an integrated circuit (IC) that not only supplies a control signal Ctrl for controlling the switch circuit 21d but also receives the uplink signal US and is configured to operate on power supplied from the power supply 23. In a specific example, the control circuit 21a may be an application specific integrated circuit (ASIC) or a micro-control unit (MCU). The control circuit 21a operates by executing a program stored in an internally provided read only memory (ROM) or random access memory (RAM).

When the downlink signal DS1 is sent, the control circuit 21a performs a process of switching, using the control signal Ctrl, the switch circuit 21d between a state in which the terminal a is connected to the common terminal c and a state in which the terminal "g" is connected to the common terminal c. Describing in more detail, when a position signal is sent using the downlink signal DS1, the control circuit 21a performs control to switch the switch circuit 21d between the above two states periodically at a given interval. As a result, a non-modulated pulse train signal is output from the switch circuit 21d. On the other hand, when a data signal is sent using the downlink signal DS1, the control circuit 21a performs control to switch the switch circuit 21d between the above two states in accordance with data Res (see FIG. 3) such as the pen pressure data P and the switch information SW. As a result, a pulse train signal modulated based on the data Res is output from the switch circuit 21d. It should be noted that the data Res may include other information such as identification information of the stylus 2 stored in the signal processing circuit 21.

When the downlink signal DS2 is sent, the control circuit 21a performs a process of switching, using the control signal Ctrl, the switch circuit 21d between a state in which the terminal b is connected to the common terminal c and a state in which the terminal g is connected to the common terminal c. Describing in more detail, when a position signal is sent using the downlink signal DS2, the control circuit 21a keeps the switch circuit 21d set to the terminal b side. As a result, the non-modulated sine wave signal v2 is output from the switch circuit 21d. On the other hand, when a data signal is sent using the downlink signal DS2, the control circuit 21a performs control to switch the switch circuit 21d between the above two states in accordance with the above data Res. As a result, a sine wave signal modulated based on the data Res is output from the switch circuit 21d.

When the uplink signal US is received, the control circuit 21a keeps the switch circuit 21d set to the terminal r side using the control signal Ctrl. As a result, electric charge that appears on the stylus electrode 20 is supplied to the receiving terminal of the control circuit 21a. As a result, the control circuit 21a receives the uplink signal US based on the electric charge supplied in this manner.

FIG. 3 is a diagram illustrating a configuration of the tablet 3B. Although the configuration of the tablet 3B, an in-cell type, will be described in detail below with reference to the figure, the tablets 3A and 3C basically have the same configuration. It should be noted, however, that the configurations are not completely the same and that the differences from the tablet 3B will be described respectively in the description of the tablet 3B given below.

As illustrated in FIG. 3, the tablet 3B is configured to include a sensor 30, a controller 31, and a host processor 32.

The sensor 30 has a configuration in which a plurality of sensor electrodes 30X, each extending in the Y direction and equally spaced in the X direction orthogonal to the Y direction, and a plurality of sensor electrodes 30Y, each extending in the X direction and equally spaced in the Y direction, are arranged in a matrix fashion. The sensor 30 is configured such that a coupling capacitance is formed between the sensor 30 and the stylus 2 based on these sensor electrodes 30X and 30Y. The sensor 30 is also used not only to detect the stylus 2 but also the finger 4. It should be noted that although an example is depicted here in which both of the sensor electrodes 30Y and 30X include linear electrodes, the sensor electrodes 30Y and 30X can also include conductors in other shapes. For example, either the sensor electrodes 30Y or the sensor electrodes 30X may include a plurality of rectangular conductors arranged two-dimensionally in such a manner as to be able to detect the two-dimensional coordinates of the stylus, as with the electrodes in the shape illustrated in Patent Document 1.

Figure 4A:
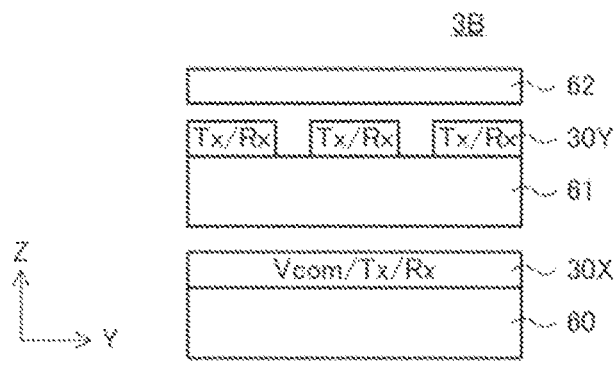
FIG. 4A is a schematic cross-sectional view illustrating arrangement of sensor electrodes 30X and 30Y in the tablet 3B.
Figure 4B:
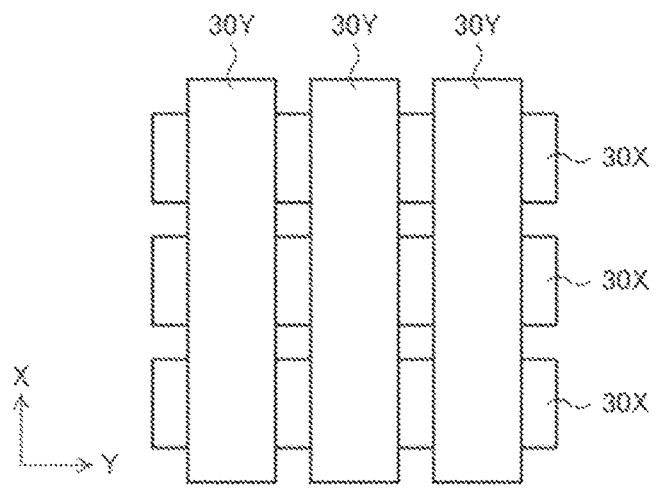
FIG. 4B is a schematic top view that corresponds to FIG. 4A.

FIG. 4A is a schematic cross-sectional view illustrating arrangement of the sensor electrodes 30X and 30Y in the tablet 3B, and FIG. 4B is a schematic top view that corresponds to FIG. 4A. In FIG. 4A, the far side from the stylus 2 is depicted at the bottom, and the side close to the stylus 2 is depicted on the top. The same holds true for FIG. 5A and FIG. 5B in this regard.

As illustrated in FIG. 4A, the tablet 3B includes, as components of the liquid crystal display device, a liquid crystal layer 60, a color filter glass 61, and a polarizer 62 successively from bottom, with the sensor electrodes 30Y and 30X arranged therebetween. More specifically, the sensor electrodes 30X are formed on the top surface of the liquid crystal layer 60, and the sensor electrodes 30Y are formed on the top surface of the color filter glass 61. Although not depicted, a transparent insulating layer is arranged, one between the sensor electrodes 30X and the color filter glass 61, and another between the sensor electrodes 30Y and the polarizer 62.

Pixel electrodes (not depicted) for each pixel are formed on the bottom side of the liquid crystal layer 60. The host processor 32 performs a driving operation on each pixel by controlling the potential of the pixel electrodes, with a given pixel driving voltage Vcom (fixed value in this case) supplied to each of the sensor electrodes 30X. Thus, because the pixel driving voltage Vcom is supplied, the sensor electrodes 30X cannot be used during the pixel driving operation to communicate with the stylus 2 or to detect the finger 4.

The plurality of sensor electrodes 30X and the plurality of sensor electrodes 30Y are arranged in such a manner as to intersect each other as illustrated in FIG. 4B. Therefore, when the tablet 3B is seen from the touch surface, intersections between the sensor electrodes 30X and 30Y appear to be arranged two-dimensionally.

Arrangement of the sensor electrodes 30X and 30Y in the tablets 3A and 3C will be next described. FIG. 5A is a schematic cross-sectional view illustrating arrangement of the sensor electrodes 30X and 30Y in the tablet 30A, and FIG. 5B is a schematic cross-sectional sectional view illustrating arrangement of the sensor electrodes 30X and 30Y in the tablet 30C.

In the tablets 3A and 3C, a common electrode 63 is formed on the top surface of the liquid crystal layer 60 as illustrated in FIGS. 5A and 5B. Also, in the tablet 3A, the sensor electrodes 30X and 30Y are arranged above the polarizer 62 as separate parts isolated from the liquid crystal display device as illustrated in FIG. 5A. In the tablet 3C, on the other hand, the sensor electrodes 30X and 30Y are arranged between the color filter glass 61 and the polarizer 62 as illustrated in FIG. 5B. Although both of the tablets 3A and 3C are non-in-cell types, the configuration of the tablet 3A may be called an "out-cell" type, and the configuration of the tablet 3C may be called an "on-cell" type.

In the tablets 3A and 3C, the pixel driving voltage Vcom described above is supplied to the common electrode 63 independent of the electrodes for the sensors and is not supplied to the sensor electrodes 30X. In the tablets 3A and 3C, therefore, the sensor electrodes 30X can be used to communicate with the stylus 2 or to detect the finger 4 even during the pixel driving operation.

Referring back to FIG. 3, the controller 31 is configured to include an MCU 40, a logic circuit 41, transmitter circuits 42 and 43, a receiver circuit 44, and a selector circuit 45.

The MCU 40 and the logic circuit 41 are control circuits that control transmission and reception operations of the controller 31 by controlling the transmitter circuits 42 and 43, the receiver circuit 44, and the selector circuit 45. Specifically, the MCU 40 is a microprocessor that includes a ROM and a RAM therein and operates based on a program stored therein. The MCU 40 also has a function to output the pixel driving voltage Vcom described above and a command COM which will be described later. On the other hand, the logic circuit 41 is configured to output control signals ctrl_1 to ctrl_4 and ctrl_r based on control performed by the MCU 40. It should be noted that the function to output the pixel driving voltage Vcom is provided to the host processor 32, but not to the MCU 40 in the tablets 3A and 3C.

The transmitter circuit 42 is a circuit that generates a finger detection signal FDS used to detect the finger 4 under control by the MCU 40. The finger detection signal FDS may be, for example, a non-modulated pulse train signal or sine wave signal.

The transmitter circuit 43 is a circuit that generates the uplink signal US under control by the MCU 40 and the logic circuit 41 and is configured to include a pattern supply circuit 50, a switch 51, a code sequence holding circuit 52, a spreading process circuit 53, and a transmission guard circuit 54 as illustrated in FIG. 3. It should be noted that although a description is given assuming that, of these, the pattern supply circuit 50, in particular, is included in the transmitter circuit 43 in the present embodiment, the pattern supply circuit 50 may be included in the MCU 40. On the other hand, the transmitter circuit 43 is not provided in the controller 31 of the tablet 3C that does not have a function to send the uplink signal US.

A description will be given here of the configuration of the uplink signal US. FIG. 6 is a diagram illustrating the configuration of the uplink signal US. As depicted in the figure, the uplink signal US used in the present embodiment includes a start bit SB made up of one bit worth of information and the command COM made up of five bits worth of information. The command COM is configured to include four bits worth of data CC0 to CC3 and one bit worth of a cyclic redundancy code CRC calculated based on the data CC0 to CC3.

The start bit SB is used by the stylus 2 to detect the presence of the controller 31 and is known to the stylus 2 in advance (before the stylus 2 detects the sensor controller 31). As will be described later, the stylus 2 detects the arrival of the uplink signal US by detecting this start bit SB. On the other hand, the tablet 3B may send the start bit SB alone without transmitting a succeeding signal. In the description given below, the uplink signal US in that case may be referred to as a shortened synchronizing signal PI, which is a signal shorter than the uplink signal US including the command COM.

The data CC0 to CC3 indicate commands issued to the stylus 2. There are two types of commands indicated by the data CC0 to CC3.

The first type is a command that includes type identification information that identifies the type of the communication protocol used between the stylus 2 and the tablet and may be hereinafter referred to as a "first command." The communication protocol type is mainly information that differentiates between advance agreements about a communication frequency (including whether the signal is a square wave or a sine wave) for the stylus 2 to send the downlink signal DS (position signal or data signal), a format of the downlink signal DS (including whether the signal is a position signal or a data signal and which type of data is sent using a data signal), and a transmission time of the downlink signal DS (timing and transmission duration). A first command is sent by the tablets 3A and 3B that have yet to detect the stylus 2. Type identification information may be given to the stylus 2 as a tablet type. Type identification information is information indicated, for example, by one bit of the data CC0 and indicates the necessary communication protocol to the stylus 2 by indicating which tablet, the tablet 3A or 3B, sent the command.

Although described in detail later, when communicating with the tablet 3B, the stylus 2 proceeds with transmission of the downlink signal DS in response to reception of the shortened synchronizing signal PI. In contrast, when the stylus 2 communicates with the tablet 3A, the shortened synchronizing signal PI is not used in the first place. The stylus 2 proceeds with transmission of the downlink signal DS in response to reception of the uplink signal US including the command COM. Therefore, it can also be said that type identification information is information that indicates whether the stylus 2 should send the downlink signal DS in response to the shortened synchronizing signal PI.

The second type is a command that identifies data to be sent by the stylus 2 such as the pen pressure data P depicted in FIG. 2 and may be hereinafter referred to as a "second command." A second command is sent by the tablets 3A and 3B that have already detected the stylus 2. In other words, a second command indicates that the controller 31 has already detected the stylus 2.

Referring back to FIG. 3, the pattern supply circuit 50 retains the start bit SB and is configured to output the start bit SB in accordance with an instruction of a control signal ctrl_t1 supplied from the logic circuit 41. On the other hand, the command COM is supplied from the MCU 40 to the transmitter circuit 43.

The switch 51 has a function to select either the pattern supply circuit 50 or the MCU 40 based on a control signal ctrl_t2 supplied from the logic circuit 41 and supply the output of the selected one to the spreading process circuit 53. When the switch 51 selects the pattern supply circuit 50, the start bit SB is supplied to the spreading process circuit 53. On the other hand, when the switch 51 selects the MCU 40, the command COM is supplied to the spreading process circuit 53.

The code sequence holding circuit 52 has a function to generate and retain a spreading code PN of a given chip length having an autocorrelation characteristic based on a control signal ctrl_t3 supplied from the logic circuit 41. The spreading code PN retained by the code sequence holding circuit 52 is supplied to the spreading process circuit 53.

The spreading process circuit 53 has a function to obtain a transmission chip sequence of a given chip length by modulating the spreading code PN retained by the code sequence holding circuit 52 based on the value (start bit SB or command COM) supplied via the switch 51. FIG. 6 illustrates an example of a transmission chip sequence obtained in relation to the start bit SB. The spreading process circuit 53 is configured to supply the obtained transmission chip sequence to the transmission guard circuit 54.

The transmission guard circuit 54 has a function to insert a guard period (period during which neither transmission nor reception is conducted) that is required to switch between transmission and reception operations, between a transmission period of the uplink signal US and a reception period of the downlink signal DS based on a control signal ctrl_t4 supplied from the logic circuit 41.

The receiver circuit 44 is a circuit for receiving the downlink signal DS sent by the stylus 2 or the finger detection signal FDS sent by the transmitter circuit 42 based on the control signal ctrl_r of the logic circuit 41. Specifically, the receiver circuit 44 is configured to include an amplifying circuit 55, a detecting circuit 56, and an analog-digital (AD) converter 57.

The amplifying circuit 55 amplifies the downlink signal DS or the finger detection signal FDS supplied from the selector circuit 45 and outputs the amplified signal. The detecting circuit 56 is a circuit that generates a voltage proportional to the level of the output signal of the amplifying circuit 55. The AD converter 57 is a circuit that generates a digital signal by sampling the voltage output from the detecting circuit 56 at a given time interval. The digital signal output by the AD converter 57 is supplied to the MCU 40. The MCU 40 detects the position of the stylus 2 or the finger 4 and obtains the data Res (e.g., the above described pen pressure data P, switch information SW, identification information) sent by the stylus 2, based on the digital signal supplied in this manner. The MCU 40 outputs the obtained coordinates x and y indicating the position and the obtained data Res one after another to the host processor 32.

The selector circuit 45 is configured to include a switch 58x, a switch 58y, a conductor selection circuit 59x, and a conductor selection circuit 59y.

The switch 58y is a switch element configured such that a common terminal and one of a T terminal and an R terminal are connected. The common terminal of the switch 58y is connected to the conductor selection circuit 59y, and the T terminal is connected to the output end of the transmitter circuit 43, and the R terminal is connected to the input end of the receiver circuit 44. On the other hand, the switch 58x is a switch element configured such that a common terminal and one of a T1 terminal, a T2 terminal, a D terminal, and an R terminal are connected. The common terminal of the switch 58x is connected to the conductor selection circuit 59x, and the T1 terminal is connected to the output end of the transmitter circuit 43, and the T2 terminal is connected to the output end of the transmitter circuit 42, and the D terminal is connected to the output end of the MCU 40 that outputs the pixel driving voltage Vcom, and the R terminal is connected to the input end of the receiver circuit 44.

The conductor selection circuit 59x is a switch element for selectively connecting the plurality of sensor electrodes 30X to the common terminal of the switch 58x. The conductor selection circuit 59x is configured to be able to simultaneously connect some or all of the plurality of sensor electrodes 30X to the common terminal of the switch 58x.

The conductor selection circuit 59y is a switch element for selectively connecting the plurality of sensor electrodes 30Y to the common terminal of the switch 58y. The conductor selection circuit 59y is also configured to be able to simultaneously connect some or all of the plurality of sensor electrodes 30Y to the common terminal of the switch 58y.

Four control signals sTRx, sTRy, selX, and selY are supplied from the logic circuit 41 to the selector circuit 45. Specifically, the control signal sTRx, the control signal sTRy, the control signal selX, and the control signal selY are supplied to the switch 58x, the switch 58y, the conductor selection circuit 59x, and the conductor selection circuit 59y, respectively. The logic circuit 41 realizes not only transmission of the uplink signal US or the finger detection signal FDS but also application of the pixel driving voltage Vcom and reception of the downlink signal DS or the finger detection signal FDS by controlling the selector circuit 45 using these control signals sTRx, sTRy, selX, and selY.

FIGS. 7 to 10 are diagrams illustrating operation of the controller 31. A detailed description will be given below of a relationship between a state in which the selector circuit 45 is controlled by the logic circuit 41 and operation of the controller 31 with reference to not only FIG. 3 but also FIGS. 7 to 10.

Figure 7:
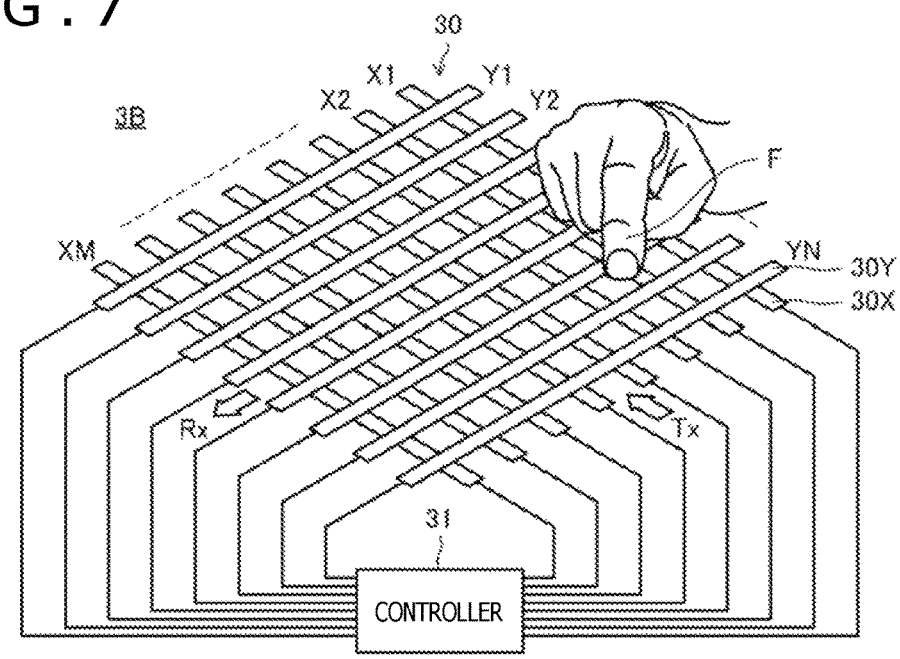
FIG. 7 is a diagram illustrating operation of a controller 31 of the tablet 3B during finger detection.

FIG. 7 is a diagram illustrating operation of the controller 31 during finger detection. In this case, the logic circuit 41 controls the switch 58x such that the T2 terminal is connected to the common terminal and controls the switch 58y such that the R terminal is connected to the common terminal. Further, the logic circuit 41 controls the conductor selection circuits 59x and 59y such that combinations of the plurality of sensor electrodes 30X and 30Y are selected one after another. This ensures that the finger detection signals FDS that have passed a plurality of intersections made up of the sensor electrodes 30X and 30Y are received by the receiver circuit 44 one after another. The MCU 40 detects the position of the finger 4 on the touch surface based on the reception strengths of the finger detection signals FDS received one after another in this manner.

Figure 8:
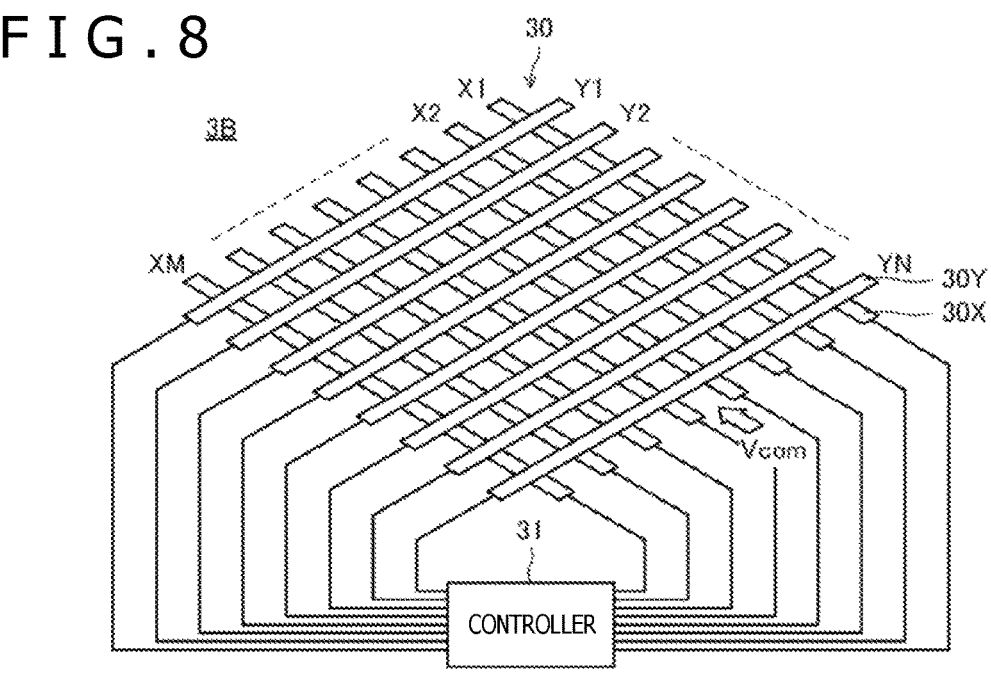
FIG. 8 is a diagram illustrating operation of the controller 31 of the tablet 3B during display operation.

FIG. 8 is a diagram illustrating operation of the controller 31 during pixel driving operation. In this case, the logic circuit 41 controls the switch 58x such that the D terminal is connected to the common terminal and controls the conductor selection circuit 59x such that all of the plurality of sensor electrodes 30X are simultaneously connected to the switch 58x. As a result, the pixel driving voltage Vcom is supplied to each of the sensor electrodes 30X from the MCU 40, making it possible for the host processor 32 to perform a pixel driving operation. It should be noted that the MCU 40 causes the logic circuit 41 to perform the above control at a timing based on a timing signal supplied from the host processor 32.

Figure 9:
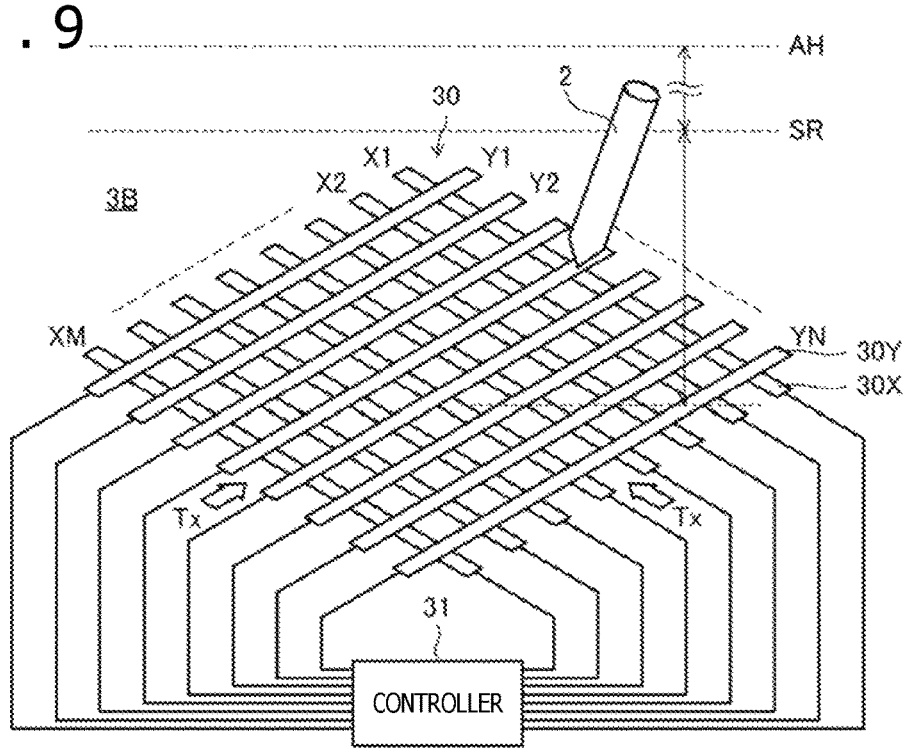
FIG. 9 is a diagram illustrating operation of the controller 31 of the tablet 3B during transmission of the uplink signal.

FIG. 9 is a diagram illustrating operation of the controller 31 during transmission of the uplink signal US. In this case, the logic circuit 41 controls the switch 58x such that the T1 terminal is connected to the common terminal and controls the switch 58y such that the T terminal is connected to the common terminal. Further, the logic circuit 41 controls the conductor selection circuits 59x and 59y such that all the plurality of sensor electrodes 30X and 30Y are simultaneously selected. As a result, the uplink signals US are sent from all of the plurality of sensor electrodes 30X and 30Y.

A description will be given here of a sensing range SR and an uplink detection height AH depicted by dotted lines in FIG. 9. First, the sensing range SR is a range within which controller 31 can receive the downlink signal DS. That is, in order for the controller 31 to receive the downlink signal DS sent by the stylus 2, it is necessary for the stylus 2 to approach the touch surface of the tablet 3B to such an extent that the downlink signal DS can reach the controller 31. The sensing range SR indicates this range within which the downlink signal DS reaches the controller 31.

The uplink detection height AH indicates the limit for the stylus 2 to receive the uplink signal US (height from the touch surface). In general, the uplink detection height AH is located at a more elevated location (location farther away from the touch surface) than the upper limit of the sensing range SR. This is due to the difference in transmission strength between the uplink signal US and the downlink signal DS. In the description given below, a state in which the stylus 2 is not in contact with the touch surface although being below the uplink detection height AH will be referred to as a "hovering state," and a state in which the stylus 2 is in contact with the touch surface will be referred to as a "contact state."

Figure 10:
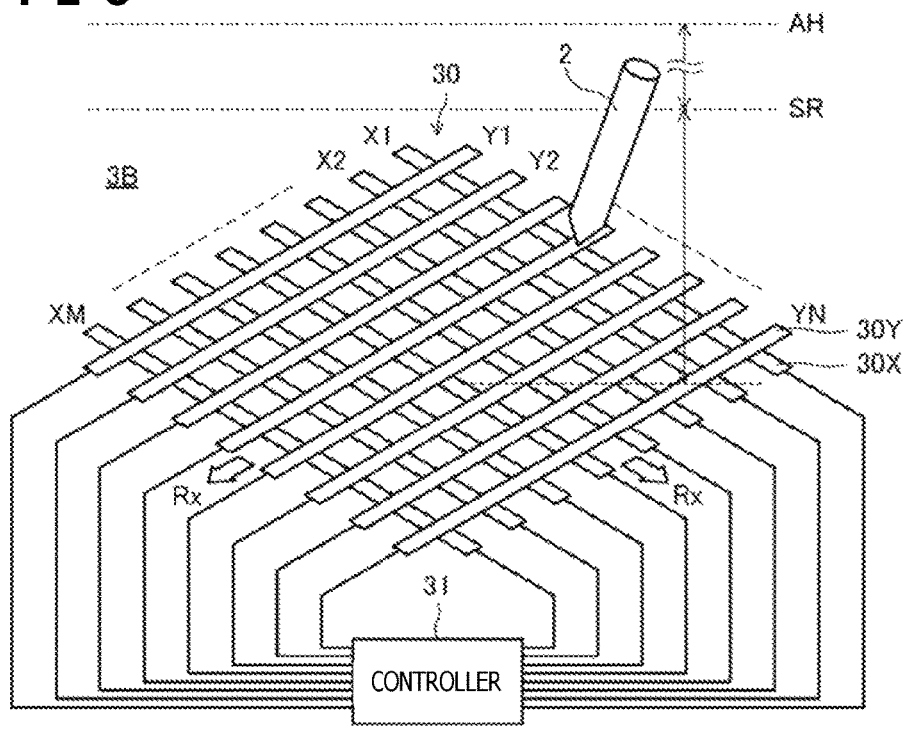
FIG. 10 is a diagram illustrating operation of the controller 31 of the tablet 3B during reception of a downlink signal.

FIG. 10 is a diagram illustrating operation of the controller 31 during reception of the downlink signal DS. In this case, the logic circuit 41 controls each of the switches 58x and 58y such that the R terminal is connected to the common terminal. The manner in which the conductor selection circuits 59x and 59y are controlled varies depending on the type of the downlink signal DS to be received.

That is, when the downlink signal DS, which is a position signal, is received, the logic circuit 41 controls the conductor selection circuits 59x and 59y such that combinations of the plurality of sensor electrodes 30X and 30Y are selected one after another. This ensures that the position signals that have passed through a plurality of intersections made up of the sensor electrodes 30X and 30Y are received by the receiver circuit 44 one after another. The MCU 40 detects the position of the stylus 2 on the touch surface based on the reception strengths of the position signals received one after another in this manner.

When the downlink signal DS, which is a data signal, is received, on the other hand, the logic circuit 41 controls the conductor selection circuits 59x and 59y such that, of the plurality of sensor electrodes 30X and 30Y, only a given number of those (e.g., one electrode), which are near the position of the stylus 2 detected as a result of immediately previous reception of a position signal, are selected. The data signal received by the selected number of sensor electrodes is supplied to the MCU 40 via the receiver circuit 44. The MCU 40 obtains the data Res described above from the data signal supplied in this manner.

The configurations of the stylus 2 and the tablets 3A to 3C have been described above. A description will be given next of operation of the stylus 2 in more detail.

Figure 11:
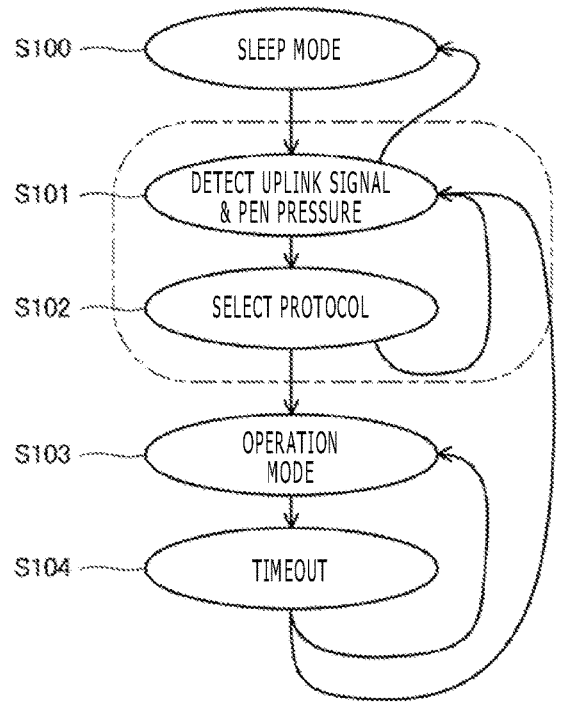
FIG. 11 is a state transition diagram of the stylus 2 depicted in FIG. 1.
Figure 12:
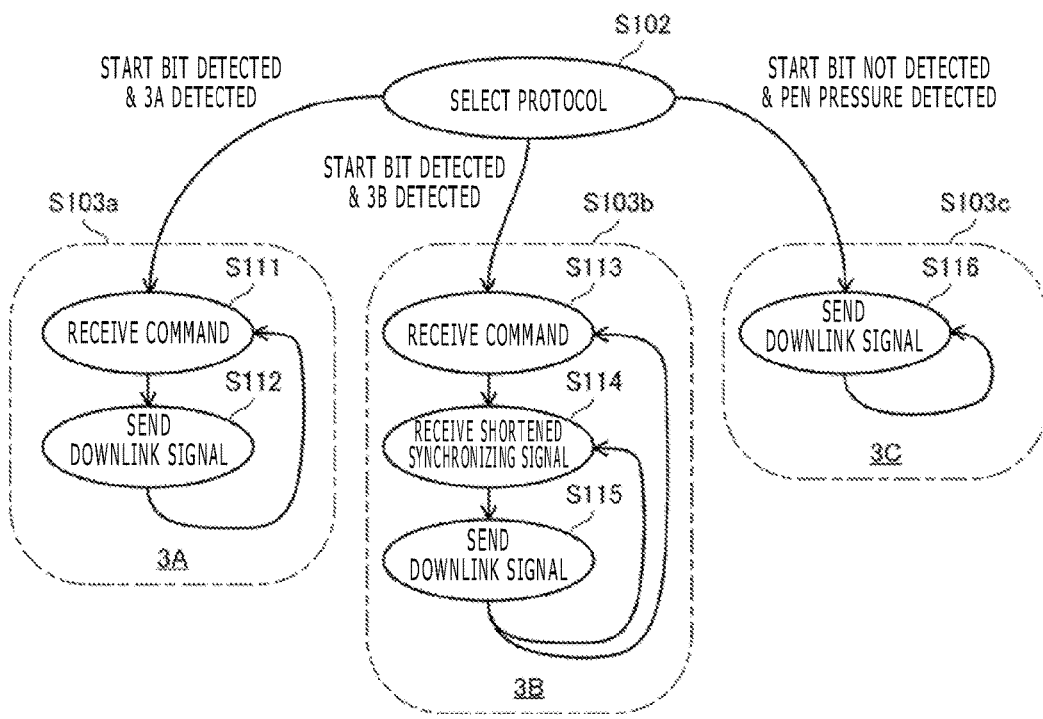
FIG. 12 is a diagram illustrating in detail operation of the stylus 2 in state S103 (operation mode) depicted in FIG. 11.

FIG. 11 is a state transition diagram of the stylus 2. On the other hand, FIG. 12 is a diagram illustrating in detail operation of the stylus 2 in state S103 (operation mode) depicted in FIG. 11.

As illustrated in FIG. 11, the initial state of the stylus 2 is sleep mode (state S100). In sleep mode, the stylus 2 does not perform any specific process other than making a transition to a state in which the uplink signal US and the pen pressure are detected periodically (state S101).

The stylus 2 in state S101 performs a detection operation to detect the uplink signal US and the pen pressure. Specifically, the stylus 2 detects the start bit SB making up the first one bit of the uplink signal US. Then, when the start bit SB is detected, the stylus 2 further detects type identification information described above. The stylus 2 also determines whether the pen pressure data P output by the pen pressure detecting circuit 24 is 0 in parallel with these detection operations.

When neither the start bit SB nor the pen pressure are detected by the detection operation performed in state S101, and when type identification information is not detected despite detection of the start bit SB, the stylus 2 repeats the detection operation to detect the uplink signal US and the pen pressure until a timeout occurs. After the timeout, the stylus 2 returns to state S100 to enter sleep mode.

On the other hand, when the start bit SB and type identification information are detected, or when the pen pressure is detected, the stylus 2 makes a transition to a state in which a communication protocol is selected (state S102). In the case of the communication protocol for communicating with the tablet 3B, for example, the usage of second periods T, which will be described later (see FIGS. 16A to 16C), and other information are included.

As illustrated in FIG. 12, when the start bit SB is detected, and when the tablet type indicated by type identification information is the tablet 3A, the stylus 2 selects the communication protocol for communicating with the tablet 3A. On the other hand, when the start bit SB is detected, and when the tablet type indicated by type identification information is the in-cell type tablet 3B, the stylus 2 selects the communication protocol for communicating with the tablet 3B. When the pen pressure is detected without detection of the start bit SB (i.e., when the pen pressure data P is not 0), the stylus 2 selects the communication protocol for communicating with the tablet 3C.

After selecting a communication protocol in state S102, the stylus 2 makes a transition to operation mode (state S103) as illustrated in FIG. 11. Operation mode is a mode in which the stylus 2 engages in communication in accordance with the selected communication protocol and is configured to include, in detail, three states S103a to S103c, as illustrated in FIG. 12.

State S103a is a mode in which the stylus 2 communicates with the tablet 3A in accordance with the communication protocol for communicating with the tablet 3A (first mode in which data is sent using M (M≥1) first periods S described later). In this case, the stylus 2 repeatedly performs a reception operation to receive the uplink signal US including the command COM (state S111) and then transmitting the downlink signal DS in accordance with the received command COM (state S112). The downlink signal DS sent in state S112 is made up of only a position signal when the command COM indicates a first command described above and is made up of a position signal and a data signal including data identified by the command COM when the command COM indicates a second command described above.

State S103 is a mode in which the stylus 2 communicates with the tablet 3B in accordance with the communication protocol for communicating with the tablet 3B (second mode in which data is sent using N (N>M) second periods T described later). In this case, the stylus 2 performs a reception operation to receive the uplink signal US including the command COM (state S113) first. After receiving the command COM in state S113, the stylus 2 prepares for transmission of a position signal when the command COM indicates a first command. On the other hand, when the received command COM indicates a second command, the stylus 2 not only prepares for transmission of a position signal but also obtains data identified by the command COM and prepares for transmission of a data signal including the obtained data.

Next, the stylus 2 performs a reception operation to receive the shortened synchronizing signal PI (state S114). As described above, the shortened synchronizing signal PI is made up of only the start bit SB and is the uplink signal US of a shorter time length than the uplink signal US that includes the command COM. Because the shortened synchronizing signal PI is a signal shorter in time length than the uplink signal US including the command COM, the stylus 2 can determine whether the detected uplink signal US is the shortened synchronizing signal PI or a signal including the command COM based on the time length of the detected uplink signal US.

When the shortened synchronizing signal PI is received, the stylus 2 sends part of the position signal or part of the data signal that has been prepared in accordance with this shortened synchronizing signal PI (state S115). Because the stylus 2 can send only one-bit information in accordance with the shortened synchronizing signal PI, the tablet 3B is configured to repeatedly send the shortened synchronizing signal PI, and the stylus 2 is configured to send part of the position signal or part of the data signal each time the shortened synchronizing signal PI is received. After the completion of transmission of all the bits of the data signal, the stylus 2 returns to state S113 and repeats the reception operation to receive the uplink signal US including the command COM. A detailed description of these aspects will be given later.

State S103c is a mode in which the stylus 2 sends the one-way downlink signal DS to the tablet 3C in accordance with the communication protocol for communicating with the tablet 3C. In this case, the stylus 2 repeatedly sends the downlink signal DS in a one-way manner (state S116).

Referring back to FIG. 11, when a defined timeout state occurs in operation mode S103, the stylus 2 makes a transition to a timeout state (state S104). This timeout state occurs when the start bit SB is not received for a defined time period as for communication with the tablets 3A and 3B. As for communication with the tablet 3C, on the other hand, a timeout state occurs when the pen pressure is no longer detected. The stylus 2 that has made a transition to a timeout state returns to state S101 and repeats the detection operation to detect the uplink signal US and the pen pressure.

The state transitions of the stylus 2 have been described above. A description will be given next in more detail of operation of the stylus 2 and the tablets 3A and 3B when the stylus 2 and each of the tablets 3A and 3B communicate with reference to timing charts.

Figure 13A:
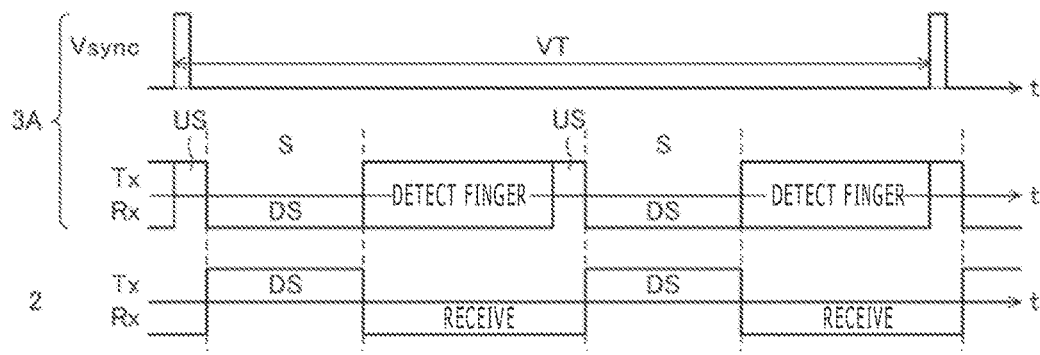
FIG. 13A is a timing chart of operation of each of the stylus 2 and the tablet 3A during communication (when data is sent using M (M≥1) first periods S)
Figure 13B:
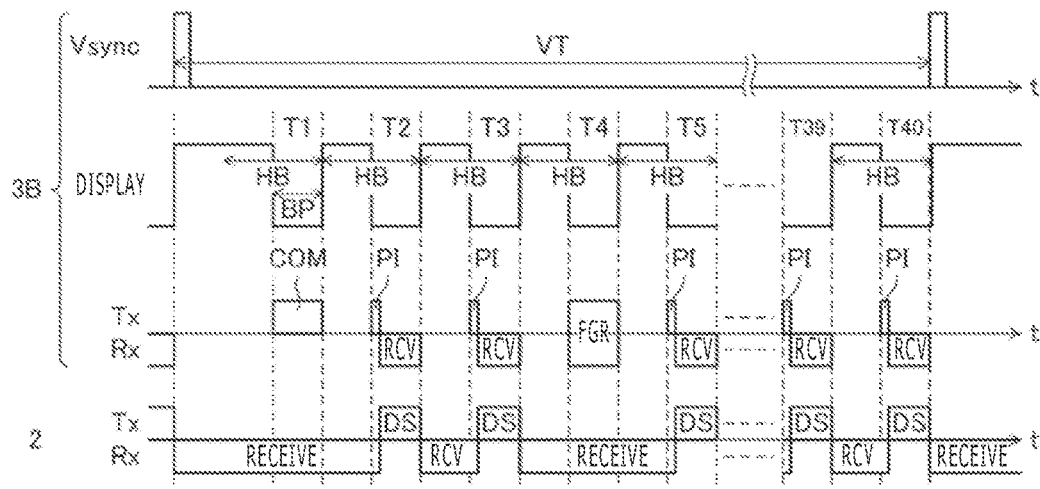
FIG. 13B is a timing chart of operation of each of the stylus 2 and the tablet 3B during communication (when data is sent using N (M≥1) second periods T).

FIG. 13A is a timing chart of operation of each of the stylus 2 and the tablet 3A during communication, and FIG. 13B is a timing chart of operation of each of the stylus 2 and the tablet 3B during communication. It should be noted that a video synchronizing signal Vsync depicted in FIGS. 13A and 13B is a pulse signal indicating a video display operation cycle VT (display cycle which is a cycle of display operation) by the host processor 32. The host processor 32 is configured to display an image frame during one operation cycle VT.

First, as illustrated in FIG. 13A, the controller 31 of the tablet 3A is configured, in principle, to repeatedly perform a transmission operation to send the uplink signal US, a reception operation to receive the downlink signal DS, and a finger detection operation in this order during one operation cycle VT. The time period during which the reception operation to receive the downlink signal DS is performed will be hereinafter referred to as the first period S. Letting the number of first periods S provided after transmission of the uplink signal US be denoted by M (M≥1), although M=1 in the example depicted in FIG. 13A, M≥2 is allowed if the data amount of the downlink signal DS is large and if it is not possible to receive the entire downlink signal DS in a single reception operation considering the necessary execution cycle of the finger detection operation. In this case, a finger detection operation is arranged during each first period S. It should be noted that the starting time of the one or the plurality of first periods S set up after the transmission period of the uplink signal US may be determined in advance by the communication protocol or may be notified from the tablet 3A to the stylus 2 by the uplink signal US.

After receiving the command COM as a result of the reception operation to receive the uplink signal US, the stylus 2 that communicates with the tablet 3A obtains the arrangement of the one or the plurality of first periods S from the selected communication protocol or the uplink signal US in state S102 depicted in FIG. 11 and sends the downlink signal DS appropriate to the received command COM using the obtained first periods S. Specifically, the stylus 2 sends a position signal first and then sends a data signal including the data specified by the command COM. Thereafter, the tablet 3A that receives this downlink signal DS detects the position of the stylus 2 based on the position signal first and then receives the data signal using the one or more sensor electrodes near the detected position.

Next, as for the tablet 3B, a plurality of horizontal blanking periods HB are arranged per operation cycle VT as illustrated in FIG. 13B. In the second half of the horizontal blanking period HB, a process is performed to bring the pixel to be driven from the right edge to the left edge of the screen, and the host processor 32 halts the pixel driving process during this process. The period during which the pixel driving process is halted in this manner is generally referred to as a blank period BP, and the tablet 3B uses this blank period BP as the second period T to communicate with the stylus 2 or detect the finger 4. The second period T is a time period shorter than the first period S, and assuming that the number of second periods T provided per operation cycle VT is N, N is a number greater than M described above (N>M). In the example depicted in FIG. 13B, although N=40 (second periods T1 to T40), N need not be 40.

Figure 14:
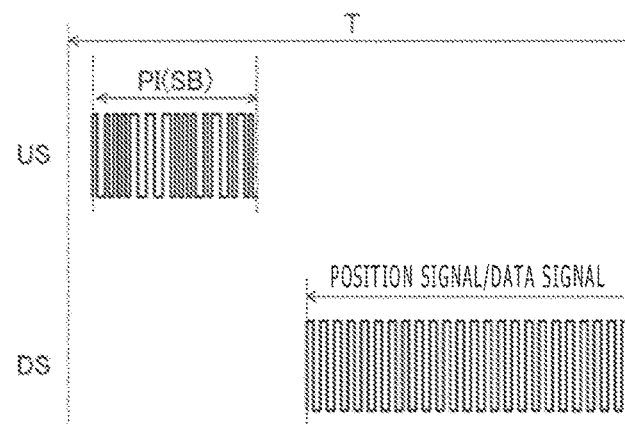
FIG. 14 is a diagram illustrating arrangement of signals in the second period T.

FIG. 14 is a diagram illustrating arrangement of signals in the second period T. As illustrated in the figure, the controller 31 of the tablet 3B sends the start bit SB as the shortened synchronizing signal PI at the time when the second period T begins. Then, the stylus 2 sends the downlink signal DS (position signal or data signal) in response to reception of this shortened synchronizing signal PI. When a data signal is sent, the amount of data that can be sent within each second period T is one bit as described above.

FIGS. 15A and 15B are diagrams illustrating how the second periods T are used in the tablet 3B. FIG. 15A illustrates the usage before detection of the stylus 2, and FIG. 15B illustrates the usage after detection of the stylus 2.

Before detecting the stylus 2, the tablet 3B sends the uplink signal US including the command COM in each of a greater number of times of the plurality of second periods T (e.g., twice in the second periods T1 and T21) than the number of times the command COM is sent after detection of the stylus 2 as illustrated in FIG. 15A. In this case, the command COM indicates a first command and includes type identification information identifying the tablet type. The tablet 3B in this case also performs a detection operation to detect the stylus 2 and the finger 4 by using other second periods T in a time-divided manner.

After detecting the stylus 2, on the other hand, the tablet 3B sends the uplink signal US including the command COM a fewer number of times than the number of times the command COM is sent before detection of the stylus 2 (e.g., only once in the second period T1) as illustrated in FIG. 15B. In this case, the command COM indicates a second command and identifies data (e.g., pen pressure data P) to be sent by the stylus 2 using the second periods T. Thereafter, the tablet 3B detects the position of the stylus 2 using each of 10 second periods T2, T5, T9, T13, T17, T21, T25, T29, T33, and T37 (stylus detection periods), receives a data signal using each of 20 second periods T3, T6, T7, T10, T11, T14, T15, T18, T19, T22, T23, T26, T27, T30, T31, T34, T35, T38, T39, and T40 (data signal reception periods), and detects the position of the finger 4 using each of nine second periods T4, T8, T12, T16, T20, T24, T28, T32, and T36 (finger detection periods).

FIGS. 16A to 16C illustrate how the second periods T are used by the stylus 2. FIG. 16A illustrates the usage before detection by the tablet 3B, and FIG. 16B illustrates the usage after detection by the tablet 3B and when the stylus 2 is in a hovering state, and FIG. 16C illustrates the usage after detection by the tablet 3B and when the stylus 2 is in a contact state.

The command COM sent by the tablet 3B that has yet to detect the stylus 2 indicates a first command that includes type identification information identifying the tablet type as described above. When detecting the uplink signal US including this command COM and finding out from the type identification information included in the uplink signal US that the originator of the uplink signal US is the tablet 3B, the stylus 2 selects the communication protocol used for communication with the tablet 3B as described with reference to FIGS. 11 and 12 and continuously sends a position signal as illustrated in FIG. 16A. It should be noted that although only the second periods T are depicted in FIG. 16A, this continuous transmission is continuously conducted during a time period between the two adjacent second periods T (time period during which a pixel driving operation is performed).

The command COM sent by the tablet 3B that has detected the stylus 2 indicates a second command that identifies data to be sent by the stylus 2 such as the pen pressure data P. The stylus 2 that has received this command COM performs different operations between the hovering state and the contact state. That is, in the hovering state, the stylus 2 sends given bits "1" and "0" alternately, besides transmitting, in order, the second bit SW2 to the first bit SW1 of the switch information SW by using the second periods T6 and T7, as illustrated in FIG. 16B. In the contact state, on the other hand, the stylus 2 sends the given bit "0" using the second period T3 and sends, in order, the 14-th bit P13 to the first bit P0 of the pen pressure data P by using the second periods T6, T7, T10, T11, T14, T15, T18, T19, T22, T23, T26, T27, T30, and T31, sends, in order, the second bit SW2 to the first bit SW1 of the switch information SW by using the second periods T34 and T35, and sends, in order, the third bit Sum2 to the first bit Sum0 of the checksum generated by the stylus 2 based on transmission data by using the second periods T38 to T40 as illustrated in FIG. 16C.

As described above, the system according to the stylus 2 and the tablet 3B of the present disclosure includes an operation mode before detection of the stylus 2 in addition to two operation modes after detection of the stylus 2 by the tablet 3B when the stylus 2 is hovering and when the stylus 2 is in contact, respectively. The stylus 2 sends a position signal or a data signal to match the formats depicted in FIGS. 16B, 16C, and 16A, respectively, in accordance with these three operation modes, i.e., based on its own state (whether it is hovering or in contact) and based on whether it has already been detected by the tablet 3B.

A more detailed description will be given next of the processes performed by each of the tablet 3B and the stylus 2 with reference to processing flows.

Figure 17:
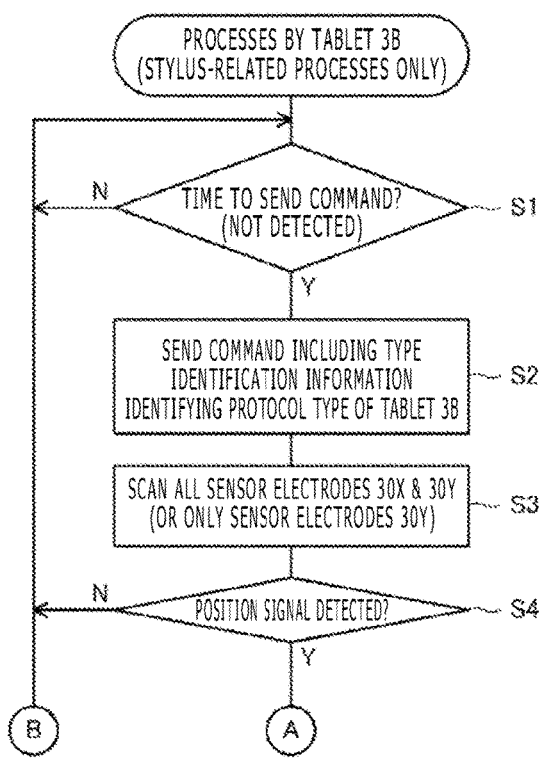
FIG. 17 is a processing flowchart of processes performed by the tablet 3B.
Figure 18:
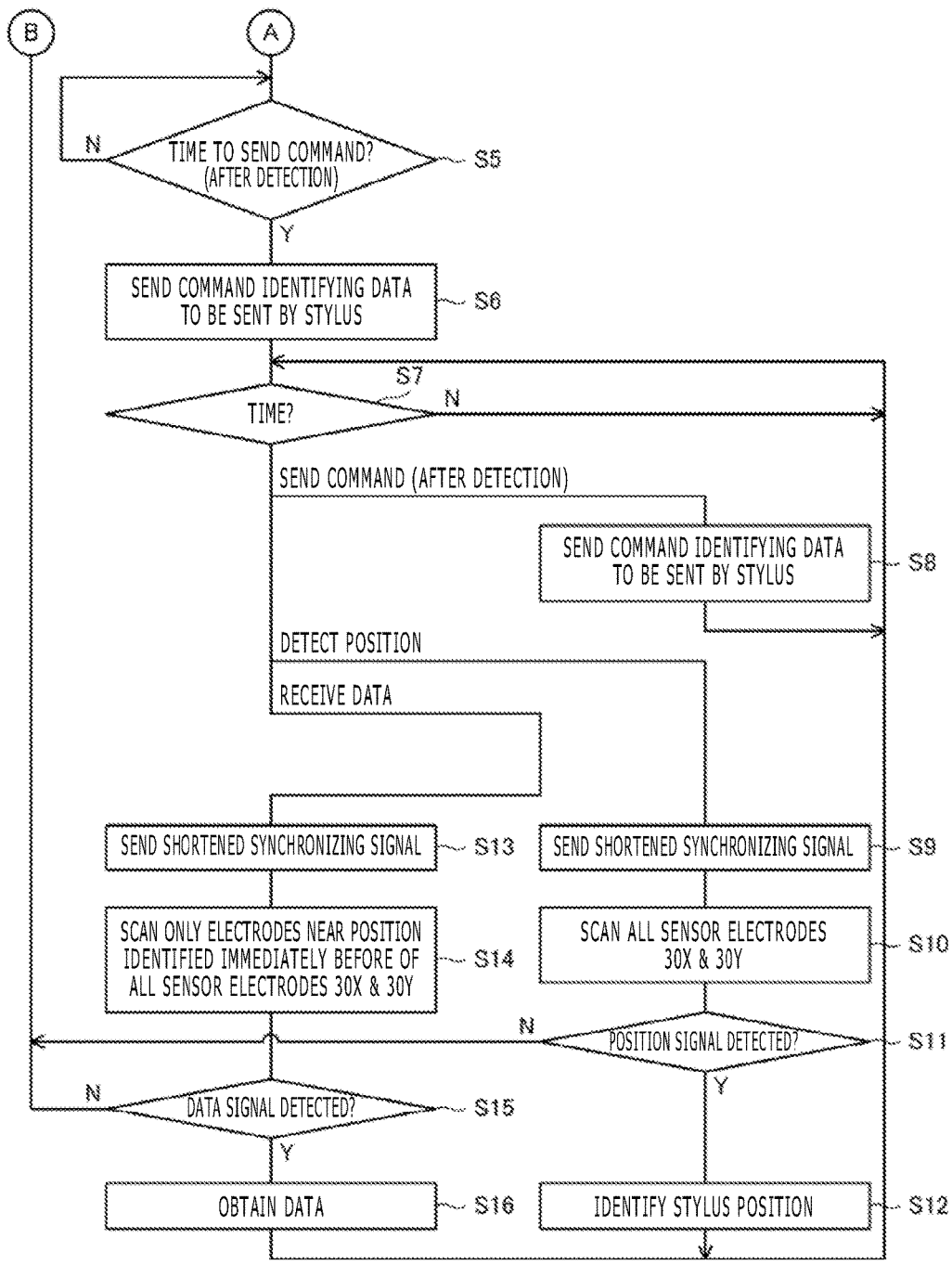
FIG. 18 is a processing flowchart of processes performed by the tablet 3B.

FIGS. 17 and 18 are processing flowcharts of processes performed by the tablet 3B. It should be noted, however, that only the processes related to the stylus 2 are depicted in the figures and that the processes related to detection of the finger 4, for example, are not depicted.

<Operation Before Detection of the Stylus>

FIG. 17 is a processing flowchart before detection of the stylus 2 by the tablet 3B. As illustrated in the figure, the tablet 3B first waits for arrival (beginning) of time (specifically, the second periods T1 and T21 depicted in FIG. 15A) to send the command COM indicating a first command (command to be sent at a stage where the stylus 2 has yet to be detected) (step S1), and when the time arrives, sends, to the stylus 2, the uplink signal US including the command COM indicating the first command that indicates the communication protocol supported by the tablet 3B (or that indicates that it is the tablet 3B) (step S2).

Next, the tablet 3B scans all the sensor electrodes 30X and 30Y using the succeeding second period T (step S3). It should be noted that because there is no need to identify the position of the stylus 2 here, only all the sensor electrodes 30Y may be scanned to reduce the scan time. This makes it possible to perform the detection operation to detect the finger 4, which is an operation performed in a time-divided manner within the same second period T, for a longer period of time.

Next, the tablet 3B determines whether a position signal has been detected as a result of the scan in step S3 (step S4). When determining that a position signal has not been detected, the tablet 3B returns to step S1 and continues with the process.

<Operation After Detection of the Stylus>

FIG. 18 is a processing flowchart after detection of the stylus 2 by the tablet 3B. When determining that a position signal has been detected as a result of the scan in step S3, the tablet 3B waits for arrival (beginning) of time (specifically, the second period T1 depicted in FIG. 15B) to send the command COM identifying data to be sent by the stylus 2 using the second period T (step S5), and when the time arrives, sends the uplink signal US including the command COM identifying the data to be sent by the stylus 2 using the second period T (step S6).

Thereafter, as illustrated in FIG. 18, the tablet 3B waits for arrival of time (second period T1 depicted in FIG. 15B) to send the command COM indicating a second command (command to be sent after detection of the stylus 2), time to detect the position of the stylus 2 (e.g., second period T2 depicted in FIG. 15B), and time to receive a data signal from the stylus 2 (e.g., second period T3 depicted in FIG. 15B) (step S7).

When the time arrives to send the command COM indicating a second command, the tablet 3B sends the uplink signal US including the command COM indicating a second command (step S8).

On the other hand, when the time arrives to detect the position of the stylus 2, the tablet 3B sends the shortened synchronizing signal PI (start bit SB) first (step S9) and next scans, in order, all the sensor electrodes 30X and 30Y (step S10). Then, the tablet 3B determines whether a position signal has been detected as a result of this scan (step S11) and, when determining that a position signal has been detected, identifies the position of the stylus 2 based on the position of the sensor electrode that detected that position signal (step S12). When determining that a position signal has not been detected, on the other hand, the tablet 3B determines that the stylus 2 has been removed from the tablet 3B and returns the process to step S1. It should be noted that although the process is returned to step S1 in response to failing to detect a position signal once in this example, the process may be returned to step S1 only when a position signal is not detected a defined number of times in series.

When the time arrives to receive a data signal from the stylus 2, the tablet 3B sends the shortened synchronizing signal PI (start bit SB) first (step S13) and next scans only the one or more sensor electrodes of all the sensor electrodes 30X and 30Y near the immediately previously identified position of the stylus 2 (step S14). Then, the tablet 3B determines as a result of this scan whether a data signal has been detected (step S15), and, when determining that a data signal has been detected, obtains the data sent by the stylus 2 by extracting the data from that data signal (step S16).

When determining that a data signal has not been detected, on the other hand, the tablet 3B determines that the stylus 2 has been removed from the tablet 3B and returns the process to step S1. It should be noted that although the process is returned to step S1 in response to failing to detect a data signal once in this example, the process may be returned to step S1 only when a data signal is not detected a given number of times in series as in step S11. Alternatively, the process may be returned to step S1 when the sum of the number of times a data signal is not detected in series and the number of times a position signal is not detected in series reaches a given number of times.

Figure 19:
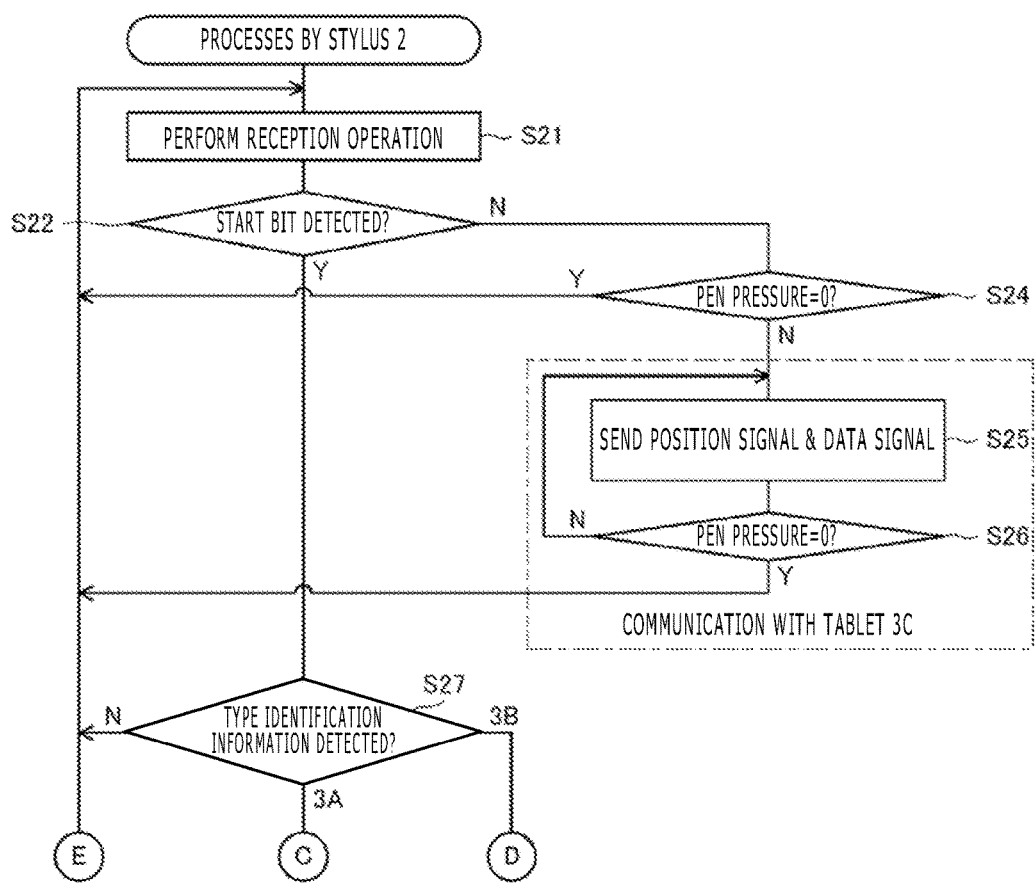
FIG. 19 is a processing flowchart of processes performed by the stylus 2.
Figure 20:
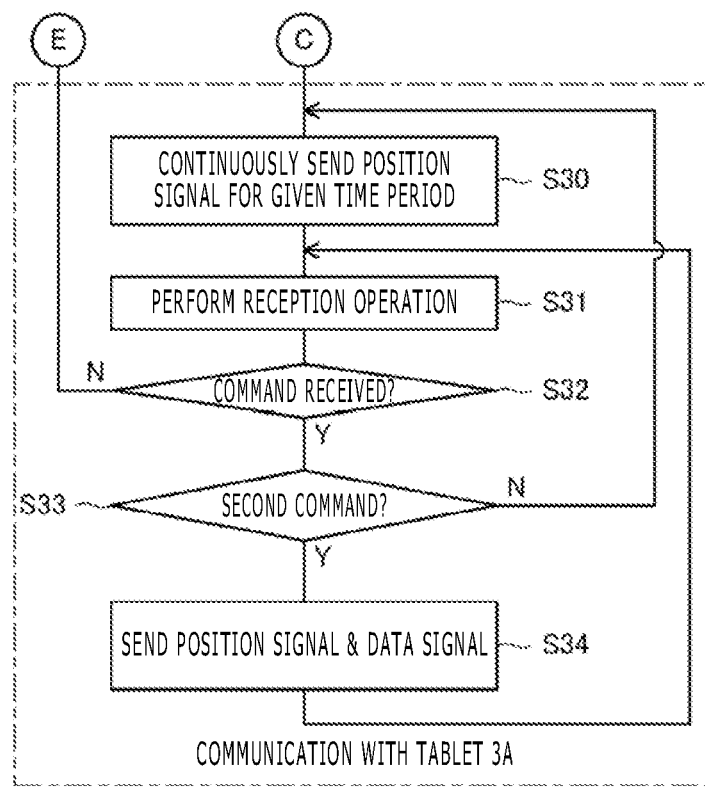
FIG. 20 is a processing flowchart of processes performed by the stylus 2.
Figure 21:
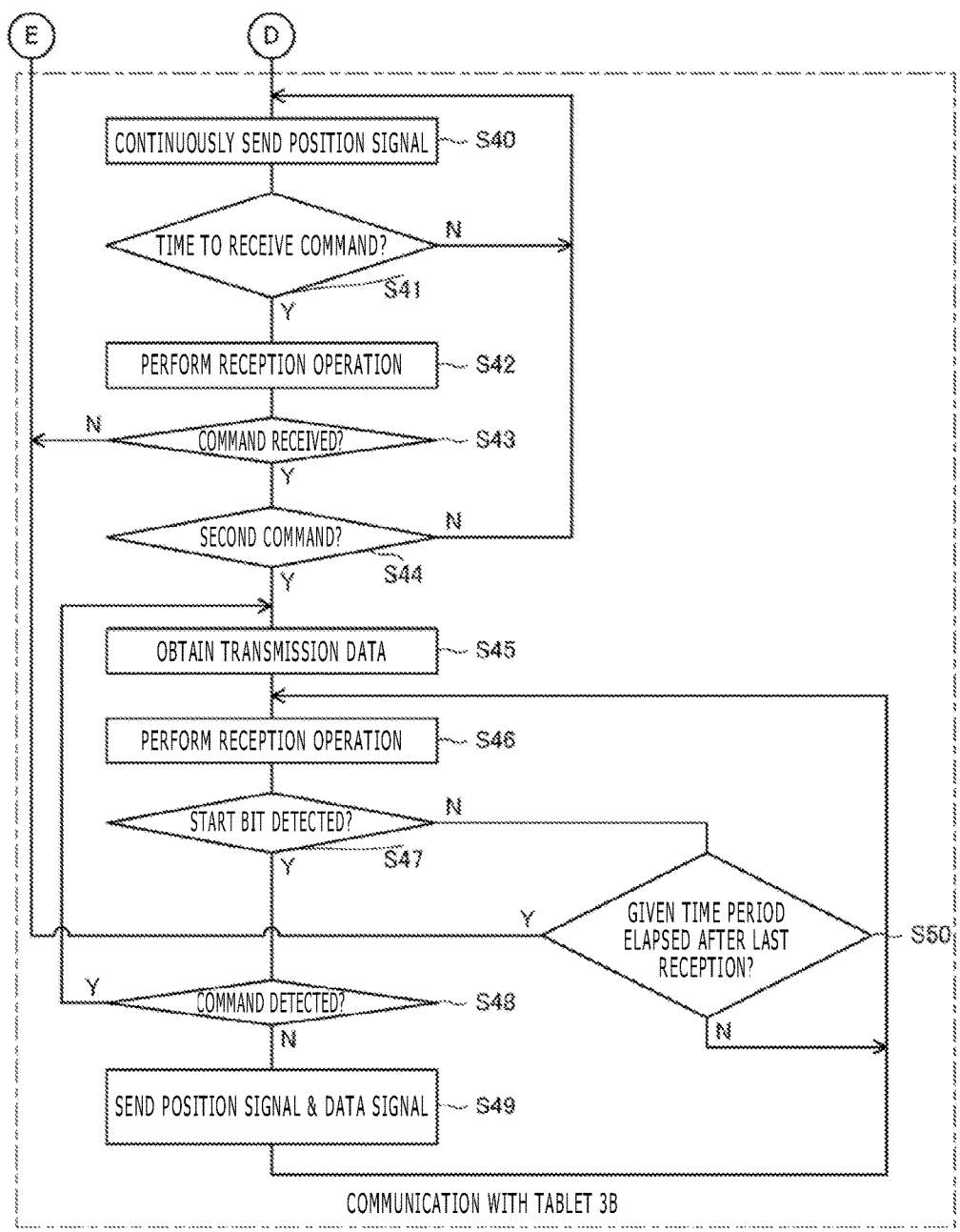
FIG. 21 is a processing flowchart of processes performed by the stylus 2.

FIGS. 19 to 21 are processing flowcharts of processes performed by the stylus 2.

<Before Detection of the Tablet 3A or 3B>

As illustrated in FIG. 19, the stylus 2 performs a reception operation first (step S21). Then, the stylus 2 determines, as a result of the reception operation, whether the start bit SB has been detected (step S22).

When determining, in step S22, that the start bit SB has not been detected, the stylus 2 determines next whether the pen pressure is 0 (step S24). When determining, as a result of the determination, that the pen pressure is 0, the stylus 2 returns to step S21. When determining that the pen pressure is not 0, on the other hand, the stylus 2 sends a position signal and a data signal (step S25). This corresponds to communication with the tablet 3C that has no transmission function to send the uplink signal US. The stylus 2 repeatedly determines whether the pen pressure has reached 0 while at the same time repeating step S25 (step S26), and terminates the communication with the tablet 3C and returns to step S21 when determining that the pen pressure has reached 0.

When determining, in step S22, that the start bit SB has been detected, the stylus 2 determines next whether type identification information has been detected (step S27). The case in which type identification information is not detected is normally a case in which the received start bit SB is the shortened synchronizing signal PI, and in this case, the stylus 2 returns the process to step S21 (negative judgment in step S27). On the other hand, when type identification information indicates that the tablet is the non-in-cell type tablet 3A, the stylus 2 starts communication with the tablet 3A in accordance with the communication protocol with a non-in-cell type tablet (FIG. 20). Similarly, when type identification information indicates that the tablet is the in-cell type tablet 3B, the stylus 2 starts communication with the tablet 3B in accordance with the communication protocol with an in-cell type tablet (FIG. 21).

<When the Tablet 3A Is Detected>

FIG. 20 is a processing flowchart of the stylus 2 when the stylus 2 detects the tablet 3A. After starting communication with the tablet 3A, the stylus 2 continuously sends a position signal for a given time period first as illustrated in the figure (step S30). Next, the stylus 2 performs a reception operation in an attempt to receive the uplink signal US including the command COM (step S31). Then, the stylus 2 determines as a result of the reception operation whether the command COM has been received (step S32), and terminates the communication with the tablet 3A and returns to step S21 when determining that the command COM has not been received. When determining that the command COM has been received, on the other hand, the stylus 2 determines whether the command COM indicates a second command (step S33).

When determining that the received command COM indicates a second command, the stylus 2 sends a position signal and a data signal (step S34) and, when the transmission ends, returns to step S31 and repeats the reception operation. As a result, each time the tablet 3A sends a second command, a process is repeated in which the stylus 2 sends a position signal and a data signal.

After determining that the received command COM does not indicate a second command, on the other hand, the stylus 2 returns to step S30 and continuously sends a position signal to notify the tablet 3A of its presence.

<When the Tablet 3B Is Detected>

FIG. 21 is a processing flowchart of the stylus 2 when the stylus 2 detects the tablet 3B. After starting communication with the tablet 3B, the stylus 2 continuously sends a position signal for a given time period first as illustrated in the figure (step S40). This continuous transmission is repeated until the time arrives to receive the uplink signal US including the command COM (specifically, second periods T1 and T21 depicted in FIGS. 16A to 16C) (step S41).

When determining in step S41 that the time has arrived to receive the uplink signal US including the command COM, the stylus 2 performs a reception operation in an attempt to receive the uplink signal US including the command COM (step S42). Then, the stylus 2 determines as a result of the reception operation whether the command COM has been received (step S43), and terminates the communication with the tablet 3B and returns to step S21 when determining that the command COM has not been received. When determining that the command COM has been received, on the other hand, the stylus 2 determines whether the command COM indicates a second command (step S44).

After determining that the received command COM does not indicate a second command, on the other hand, the stylus 2 returns to step S40 and continuously sends a position signal to notify the tablet 3B of its presence.

After determining that the received command COM indicates a second command, on the other hand, the stylus 2 obtains transmission data identified by the command COM (step S45). Then, the stylus 2 performs a reception operation again (step S46) and determines whether the start bit SB has been detected (step S47). When determining as a result of the determination that the start bit SB has been detected, the stylus 2 further determines whether the command COM has been received following the detection of the start bit SB (step S48) and, when determining that the command COM has been received, returns to step S45 and obtains again transmission data identified by the new command COM. When determining that the command COM has not been received, on the other hand, the stylus 2 sends a position signal or a data signal in accordance with transmission assignment to each of the second periods T depicted in FIG. 16B or 16C (step S46). Then, the stylus 2 returns to step S46 and waits for reception of the start bit SB again.

When determining, in step S47, that the start bit SB has not been detected in step S47, the stylus 2 determines further whether a given time period has elapsed from the last reception of the start bit SB (step S50). Then, when determining that the given time period has elapsed (i.e., when failure to detect the uplink signal US continues for a given time period), the stylus 2 terminates communication with the tablet 3B and returns to step S21. When determining that the given time period has not elapsed, on the other hand, the stylus 2 returns to step S46 and performs a reception operation to receive the start bit SB again.

As described above, according to the present disclosure, the stylus 2 can improve the data transmission efficiency by transmitting data such as the pen pressure data P using a relatively fewer number of first periods S when the communication protocol type indicated by the command COM indicates that the tablet transmitting the uplink signal US is a non-in-cell type (the tablet 3A). On the other hand, the stylus 2 can prevent loss of transmission information due to reception failure of the tablet 3B by transmitting data such as the pen pressure data P using a relatively more number of second periods T when the communication protocol type indicated by the command COM indicates that the tablet transmitting the uplink signal US is an in-cell type (the tablet 3B). This makes it possible to configure the stylus 2 such that the stylus 2 can be used with both the non-in-cell type tablet 3A and the in-cell type tablet 3B.

Also, the stylus 2 can detect the arrival (beginning) of each second period T (each of blank periods BP) based on a simple shortened synchronizing signal, called the shortened synchronizing signal PI (start bit SB). Thus, when the stylus 2 initiates communication with the tablet 3B, there is no need for the tablet 3B to send the uplink signal US including information indicating arrangement of the blank periods BP (e.g., interval, duration). Therefore, it is possible to reduce the amount of time required from the detection of the uplink signal US from the tablet 3B by the stylus 2 to the start of transmission of the downlink signal DS to the tablet 3B.

Further, the controller 31 of the tablet 3B sends the command COM only once within each operation cycle VT after the detection of the stylus 2, making it possible to secure the rate at which position detection is performed when the stylus 2 is used with the tablet 3B.

Figure 22:
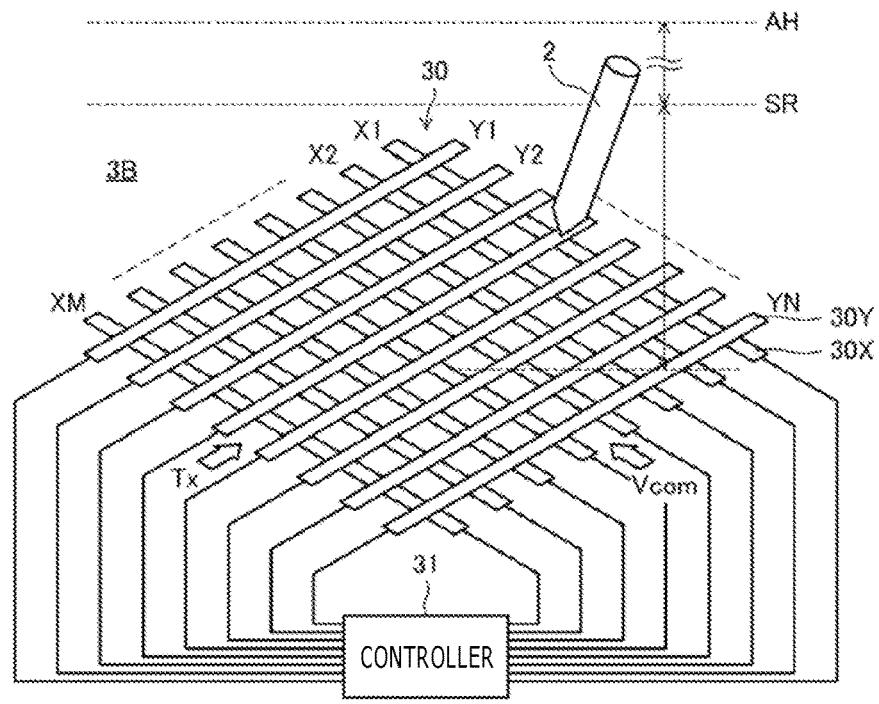
FIG. 22 is a diagram illustrating operation of the controller 31 of the tablet 3B according to a second embodiment of the present disclosure during pixel driving.

FIG. 22 is a diagram illustrating operation of the controller 31 of the tablet 3B according to a second embodiment of the present disclosure during pixel driving. As can be understood by comparison between FIG. 22 and FIG. 8, the controller 31 according to the present embodiment differs from the first embodiment in that the sensor electrodes 30Y are used as transmitting electrodes even during the time period in which the pixels are driven (pixel driving period) and is similar to the first embodiment in all other respects. A detailed description will be given below of the present embodiment with focus on differences from the first embodiment.

Figure 23:
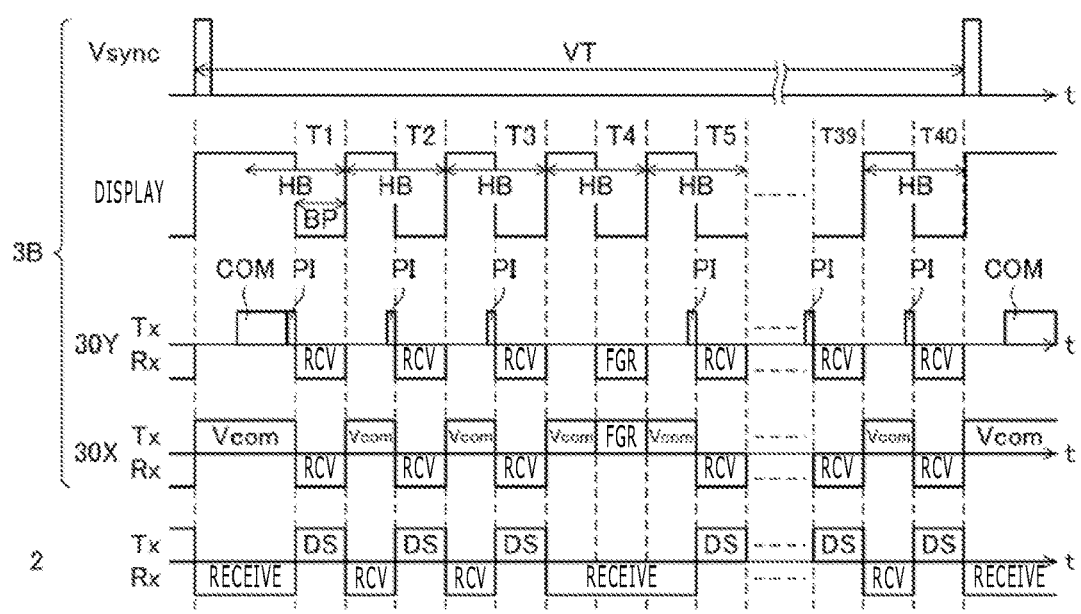
FIG. 23 is timing charts of operation of the stylus 2 and the tablet 3B according to the second embodiment of the present disclosure during communication.

FIG. 23 is timing charts of operation of the stylus 2 and the tablet 3B according to the present embodiment during communication. As illustrated in the figure, the controller 31 of the tablet 3B according to the present embodiment (see FIG. 3) sends the uplink signal US including the command COM and the shortened synchronizing signal PI using the sensor electrodes 30Y (second electrodes) during the pixel driving period in which the pixel driving voltage Vcom is supplied to the sensor electrodes 30X (first electrodes). That is, the controller 31 of the tablet 3B according to the present embodiment sends the uplink signal US by efficiently using idle time of the sensor electrodes 30Y that occurs in the first embodiment.

According to the present embodiment, the command COM is sent and received outside the second periods T, making it possible to also use the second period T1 for transmitting and receiving the downlink signal DS. Therefore, it is possible to improve the rate at which the position of the stylus 2 is detected as compared to the first embodiment when the second period T1 is used, for example, to send and receive a position signal. Also, when the second period T1 is used to send and receive a data signal, it is possible to increase the amount of data sent by the stylus 2 as compared to the first embodiment. Further, when the second period T1 is used to detect the position of the finger 4, it is possible to improve the rate at which the position of the finger 4 is detected as compared to the first embodiment.

According to the present embodiment, the shortened synchronizing signal PI is sent and received outside the second period T, making it possible to send and receive the downlink signal DS using the entire second period T. Therefore, two-bit data, for example, can be sent within the single second period T, making it possible to increase the amount of data sent by the stylus 2 as compared to the first embodiment. Also, when the data amount of a data signal is maintained, the frequency at which a data signal is sent can be reduced, making it possible to improve the rate at which the position of the stylus 2 or the finger 4 is detected as compared to the first embodiment.

Figure 24:
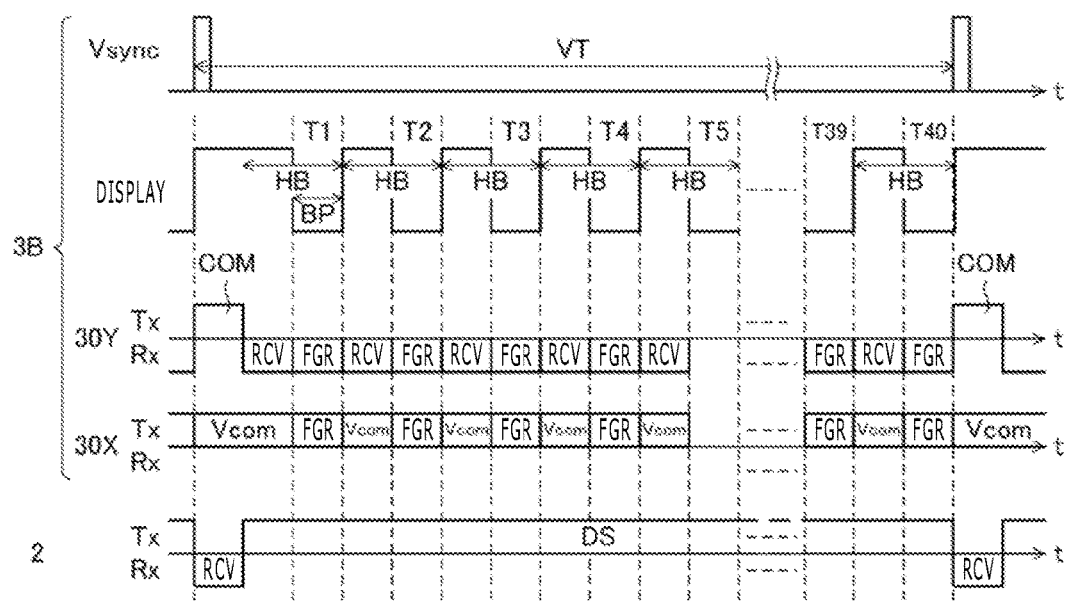
FIG. 24 is timing charts of operation of the stylus 2 and the tablet 3B according to a third embodiment of the present disclosure during communication.

FIG. 24 is timing charts of operation of the stylus 2 and the tablet 3B according to a third embodiment of the present disclosure during communication. The figure illustrates operation before detection of the stylus 2 by the tablet 3B.

As described above, in the first embodiment, before detection of the stylus 2, the tablet 3B performed a detection operation to detect the stylus 2 and a detection operation to detect the finger 4 in a time-divided manner during each second period T. This is also true in the second embodiment. In contrast, the tablet 3B according to the present embodiment performs only a detection operation to detect the finger 4 during each second period T and performs a detection operation to detect the stylus 2 outside the second period T. The present embodiment is similar to the second embodiment in all other respects. A detailed description will be given below of the present embodiment with focus on differences from the second embodiment.

As illustrated in FIG. 24, after transmitting the uplink signal US including the command COM before the beginning of the second period T1, the controller 31 of the tablet 3B according to the present embodiment performs a reception operation to receive a position signal sent by the stylus 2 by taking advantage of time between the second periods T1 and using only the sensor electrodes 30Y. The position of the stylus 2 cannot be detected because only the sensor electrodes 30Y are used. However, the presence of the stylus 2 can be detected. After detecting the presence of the stylus 2, the controller 31 can detect the position of the stylus 2 by receiving the downlink signal DS including a position signal by using both of the sensor electrodes 30X and 30Y within the second period T, for example, as illustrated in FIG. 23.

It should be noted that although, in FIG. 24, a reception operation to receive a position signal is performed before the beginning of the second period T1 also, this reception operation may be omitted if there is not enough time. Although not depicted in FIG. 24, the controller 31 of the tablet 3B according to the present embodiment sends the command COM, which is sent within the second period T21 in the first embodiment, between the second periods T20 and T21 and need not perform a reception operation during this time period.

According to the present embodiment, it is possible to secure a longer amount of time that can be spent on detecting the position of the finger 4 than in the first embodiment at a stage before detection of the stylus 2 by the tablet 3B.

Although preferred embodiments of the present disclosure have been described above, the present disclosure is in no way limited by these embodiments, and of course the present disclosure can be carried out in various forms without departing from the subject matter of the present disclosure.

For example, the position of the stylus 2 was detected per every second period T in the above embodiments as illustrated in steps S9 to S12 in FIG. 18. However, if all of the sensor electrodes 30X and 30Y cannot be scanned because of the short second period T, a plurality of second periods T (e.g., all of the second periods T used to receive a position signal within the single operation cycle VT) may be used to scan all of the sensor electrodes 30X and 30Y. The same is true for detection of the finger 4.

Also, although it was stated in the above embodiments that a data signal and a position signal were sent at separate times, the transmission time of a position signal may be replaced by the transmission time of a data signal when the transmission of a position signal is not necessary as when the tablet can identify the position of the stylus 2 based on a data signal.

Also, although the description was given in the above embodiments by taking a liquid crystal display device as an example, the present disclosure is applicable to other display device (e.g., organic electroluminescence (EL)) of a type that carious out display such that a plurality of blank periods BP are provided within a display cycle.

Also, although, as the stylus 2, a triple-usage stylus supporting three communication protocols for use between the tablets 3A, 3B, and 3C was described, the stylus 2 may be one that operates in combination with arbitrary one or two of these.

Also, the stylus 2 may be configured to include an input such as a switch to accept user operation rather than a function to receive the uplink signal US, so that the communication protocol is switched between those of the tablets 3A, 3B, and 3C in response to user operation performed on the input without having to receive the uplink signal US.

DESCRIPTION OF REFERENCE SYMBOLS

2 Stylus
3A to 3C Tablets
4 Finger
20 Stylus electrode
21 Signal processing circuit
21a Control circuit
21b Step-up circuit
21c Oscillating circuit
21d Switch circuit
22 Amplifying circuit
23 Power supply
24 Pen pressure detecting circuit
25 Switch
30 Sensor
30X, 30Y Sensor electrodes
31 Controller
32 Host processor
41 Logic circuit
42, 43 Transmitter circuits
44 Receiver circuit
45 Selector circuit
50 Pattern supply circuit
51 Switch
52 Code sequence holding circuit
53 Spreading process circuit
54 Transmission guard circuit
55 Amplifying circuit
56 Detecting circuit
57 Analog-digital converter
58x, 58y Switches
59x, 59y Conductor selection circuits
60 Liquid crystal layer
61 Color filter glass 62 Polarizer
63 Common electrode
AH Uplink detection height
BP Blank period
COM Command
CRC Cyclic redundancy code
DS, DS1, DS2 Downlink signals
FDS Finger detection signal
HB Horizontal blanking period
P Pen pressure data
PI Shortened synchronizing signal
Res Data
S First periods
SB Start bit
SR Sensing range
SW Switch information
T, T1 to T40 Second periods (blank periods)
US Uplink signal
Vcom Pixel driving voltage
Vsync Video synchronizing signal
VT Operation cycle

The invention claimed is:

1. A controller of an in-cell type liquid crystal display device, the controller controlling first and second electrodes that intersect each other, supplying a pixel driving voltage to the first electrodes during a pixel driving period, and detecting a stylus position using the first and second electrodes during a stylus detection period different from the pixel driving period, wherein the controller, by driving the second electrodes, transmits a command requesting a transmission of a downlink signal to the stylus, wherein the second electrodes are disposed closer to a display surface of the in-cell type crystal display device than the first electrodes so as to be disposed between the display surface and the first electrodes, and the controller detects, using the first and second electrodes, the downlink signal transmitted from the stylus in response to the command, and detects the stylus position based on the detected downlink signal.

2. The controller of claim 1, which, in operation, transmits the command during the pixel driving period.

3. The controller of claim 1, which, after the transmission of the command, first detects the downlink signal using only the second electrodes and thereafter detects, using the first and second electrodes, the downlink signal to detect the stylus position.

4. The controller of claim 1, wherein the first electrodes and the second electrodes are arranged in a two-dimensional array.

5. The controller of claim 4, wherein the first electrodes and the second electrodes are arranged in rows and columns that are respectively addressable.

6. A controller of an in-cell type display device, the controller controlling electrodes that cover a two-dimensional area, supplying a pixel driving voltage to the electrodes during a pixel driving period, and detecting a stylus position using the electrodes during a stylus detection period different from the pixel driving period, wherein the controller, by driving a part of the electrodes which is less than all of the electrodes, transmits a command requesting a transmission of a downlink signal to the stylus, wherein said part of the electrodes are disposed closer to a display surface of the in-cell type display device than a remainder of the electrodes so as to be disposed between the display surface and the remainder of the electrodes, and the controller, during the stylus detection period, detects, using the electrodes, the downlink signal transmitted from the stylus in response to the command, and detects the stylus position based on the detected downlink signal.

7. The controller of claim 6, which, in operation, transmits the command during the pixel driving period.

8. The controller of claim 6, which, after the transmission of the command, first detects the downlink signal using a part of the electrodes which is less than all of the electrodes, and thereafter detects, using the electrodes, the downlink signal to detect the stylus position.

9. The controller of claim 6, wherein the electrodes are arranged in a two-dimensional array.

10. The controller of claim 9, wherein the electrodes are arranged in rows and columns that are respectively addressable.

11. The controller of claim 6, wherein at least one insulating layer is arranged between said part of the electrodes and the remainder of the electrodes.

12. The controller of claim 11, wherein the insulating layer is transparent.

13. The controller of claim 11, wherein two insulating layers are arranged between said part of the electrodes and the remainder of the electrodes.

14. The controller of claim 13, wherein the two insulating layers sandwich a color filter glass therebetween.

15. The controller of claim 1, wherein at least one insulating layer is arranged between the second electrodes and the first electrodes.

16. The controller of claim 15, wherein the insulating layer is transparent.

17. The controller of claim 15, wherein two insulating layers are arranged between the second electrodes and the first electrodes.

18. The controller of claim 17, wherein the two insulating layers sandwich a color filter glass therebetween.

* * * * *